United States Patent
Chu

(10) Patent No.: US 11,859,741 B2
(45) Date of Patent: Jan. 2, 2024

(54) COUPLING APPARATUS AND CORRUGATED HOSE ARRANGEMENT

(71) Applicant: DELFINGEN FR-Anteuil S.A., Anteuil (FR)

(72) Inventor: Van Ngoc Chu, Poing (DE)

(73) Assignee: DELFINGEN FR-ANTEUIL S.A., Anteuil (FR)

( * ) Notice: Subject to any disclaimer, the term of this patent is extended or adjusted under 35 U.S.C. 154(b) by 0 days.

(21) Appl. No.: 17/777,969

(22) PCT Filed: Nov. 19, 2020

(86) PCT No.: PCT/EP2020/082782
§ 371 (c)(1),
(2) Date: May 18, 2022

(87) PCT Pub. No.: WO2021/099520
PCT Pub. Date: May 27, 2021

(65) Prior Publication Data
US 2022/0403962 A1    Dec. 22, 2022

(30) Foreign Application Priority Data

Nov. 19, 2019  (DE) ..................... 10 2019 131 219.1

(51) Int. Cl.
*F16L 37/098* (2006.01)
*F16L 37/10* (2006.01)
(Continued)

(52) U.S. Cl.
CPC ........... *F16L 25/0045* (2013.01); *F16L 33/26* (2013.01); *F16L 37/098* (2013.01); *F16L 37/101* (2013.01); *F16L 37/133* (2013.01)

(58) Field of Classification Search
CPC ... F16L 25/0036; F16L 25/0045; F16L 33/26; F16L 37/098; F16L 37/101; F16L 37/133
See application file for complete search history.

(56) References Cited

U.S. PATENT DOCUMENTS 5,112,086 A * 5/1992 Gruber ............... F16L 25/0045
5,407,236 A    4/1995 Schwarz et al.
(Continued)

FOREIGN PATENT DOCUMENTS

CN    108953807 A    12/2018
DE      8610238 U1    8/1986
(Continued)

OTHER PUBLICATIONS

ISA European Patent Office, International Search Report and Written Opinion Issued in Application No. PCT/ EP2020/082782, dated Feb. 25, 2021, WIPO, 14 pages.

*Primary Examiner* — Zachary T Dragicevich
(74) *Attorney, Agent, or Firm* — Alleman Hall Creasman & Tuttle LLP

(57) ABSTRACT

A coupling apparatus for a corrugated hose, having a receptacle part for receiving the corrugated hose and a locking part, mounted on the receptacle part, for locking the corrugated hose in the coupling apparatus, wherein the locking part has a resiliently deformable engaging element for interlocking engagement in a corrugation of the corrugated hose, the receptacle part having a receptacle region for receiving the engaging element, wherein the coupling apparatus can be brought by means of a movement of the locking part relative to the receptacle part from an unlocked state, in which the engaging element is arranged outside of the receptacle region, into a locked state, in which the engaging element is arranged within the receptacle region such that the receptacle region blocks a movement of the engaging element in a radial direction of the coupling apparatus, and vice versa.

15 Claims, 17 Drawing Sheets

(51) Int. Cl.
   *F16L 37/133*   (2006.01)
   *F16L 33/26*    (2006.01)
   *F16L 25/00*    (2006.01)

(56) References Cited

U.S. PATENT DOCUMENTS

| | | | | |
|---|---|---|---|---|
| 6,237,969 | B1* | 5/2001 | Amatsutsu | F16L 25/0036 |
| 2001/0008342 | A1* | 7/2001 | Kikumori | F16L 25/0036 |
| 2004/0232694 | A1* | 11/2004 | Martin | F16L 25/0045 |
| 2009/0039647 | A1* | 2/2009 | Schwarz | F16L 25/0045 |
| 2011/0148100 | A1 | 6/2011 | Lei et al. | |
| 2014/0291984 | A1* | 10/2014 | Dorsch | F16L 25/0045 |
| 2017/0292644 | A1* | 10/2017 | Girola | F16L 25/0054 |
| 2018/0076606 | A1* | 3/2018 | Sugimoto | F16L 11/15 |

FOREIGN PATENT DOCUMENTS

| | | |
|---|---|---|
| EP | 0634600 A1 | 1/1995 |
| EP | 2252822 | 11/2010 |
| EP | 3633257 A1 | 4/2020 |
| KR | 20120105917 A | 9/2012 |
| WO | 0179738 A1 | 10/2001 |
| WO | 2015199630 A1 | 12/2015 |

* cited by examiner

COUPLING APPARATUS AND CORRUGATED HOSE ARRANGEMENT

FIELD

The present invention relates to a coupling apparatus for a corrugated hose and to a corrugated hose arrangement having such a coupling apparatus.

BACKGROUND

Corrugated hoses or corrugated pipes can in particular be used in automotive engineering as protective conduits for lines, such as electrical cables or fluid lines. Alternatively, such corrugated hoses can also themselves be fluid carriers. They can, for example, be used as fuel lines, as filling pipes for windscreen washer tanks, or as windscreen washer lines. In order to connect such corrugated hoses with other components, such as plugs, hoses, or the like, releasable quick couplings can be used.

EP 2 252 822 B1 describes a coupling apparatus for a corrugated hose. The coupling apparatus comprises a coupling part as well as a plug-in part insertable therein, wherein the coupling part comprises an inner holding device, through which the corrugated hose can be guided in the direction of the plug-in part. The holding device can perform resilient radial movements but secures the corrugated hose against being pulled off.

With this as the background, an object of the present invention consists in providing an improved coupling apparatus.

SUMMARY

Accordingly, a coupling apparatus for a corrugated hose is proposed. The coupling apparatus comprises a receptacle part for receiving the corrugated hose and a locking part, mounted on the receptacle part, for locking the corrugated hose in the coupling apparatus. The locking part has a resiliently deformable engaging element for interlocking engagement in a corrugation of the corrugated hose, wherein the receptacle part has a receptacle region for receiving the engaging element, wherein the coupling apparatus can be brought by means of a movement of the locking part relative to the receptacle part from an unlocked state, in which the engaging element is arranged outside of the receptacle region, into a locked state, in which the engaging element is arranged within the receptacle region such that the receptacle region blocks a movement of the engaging element in a radial direction of the coupling apparatus, and vice versa, wherein the receptacle part preferably has a latching hook, wherein the locking part preferably has a first latching rib, in which the latching hook interlockingly engages in the unlocked state, and a second latching rib, in which the latching hook interlockingly engages in the locked state, and wherein the first latching rib and the second latching rib are preferably arranged at a distance from one another along an axis of symmetry of the coupling apparatus.

In that the coupling apparatus can be brought by means of the movement, in particular a rotational movement, from the unlocked state into the locked state, it is possible to achieve a highest possible contact pressure of the corrugated hose against the coupling apparatus. This ensures sufficient sealing of the corrugated hose with respect to the coupling apparatus. The movement can furthermore be carried out in an automated manner, which makes automation of the assembly process possible.

The movement of the locking part relative to the receptacle part is preferably a rotational movement. The rotational movement may, for example, be realized by means of a screw joint or a bayonet closure. Particularly preferably, the locking part is mounted on the receptacle part so as to be rotatable about the axis of symmetry. Alternatively, the movement may also be a linear movement, in particular along the axis of symmetry. In the case of a linear movement, the locking part can, for example, be inserted into the receptacle part along the axis of symmetry and be in particular latched there.

The coupling apparatus is preferably used in the field of motor vehicle technology. The coupling apparatus can, however, also be used in any other field. The coupling apparatus may also be referred to as a coupling or connection apparatus. The coupling apparatus, and in particular the receptacle part and the locking part, preferably has a rotationally symmetrical structure with respect to the axis of symmetry. A longitudinal direction is furthermore assigned to the coupling apparatus. The longitudinal direction corresponds to the axis of symmetry or is oriented in parallel thereto. The corrugated hose also has a rotationally symmetrical structure with respect to the axis of symmetry. The radial direction is oriented orthogonally to the axis of symmetry and points away from it. A circumferential direction is furthermore assigned to the coupling apparatus and is oriented clockwise or counterclockwise about the axis of symmetry.

The coupling apparatus is or the components of the coupling apparatus are preferably manufactured from a plastic material. The plastic material may, for example, be polyoxymethylene (POM), polypropylene (PP), or another suitable plastic material. The receptacle part and the locking part are preferably plastic injection-molded components. The receptacle part and the locking part may also be produced in a multi-component injection-molding method. It is possible here to manufacture the receptacle part and/or the locking part from different plastics. Furthermore, the receptacle part and/or the locking part may also each be manufactured from a metallic material.

The corrugated hose may also be referred to as a corrugated pipe or is a corrugated pipe. The corrugated hose is in particular produced by means of an extrusion method. The corrugation of the corrugated hose is preferably molded onto the corrugated hose by means of a corrugator. The corrugated hose may also be constructed of a plurality of different plastic materials. In this case, the corrugated hose may, for example, be produced by means of a multi-component extrusion method and/or by means of a multi-layer extrusion method. For example, two differently soft or flexible plastic materials may be used.

The corrugated hose is in particular received in the receptacle region of the receptacle part. In doing so, an end portion of the corrugated hose is in particular received in the receptacle region. The corrugation of the corrugated hose comprises alternately arranged wave crests and wave valleys. The corrugated hose may be cut in a wave crest or in a wave valley. The engaging element preferably engages in a wave valley of the corrugation or between two wave crests. The corrugated hose is preferably guided through the locking part and at least in sections through the receptacle part.

The engaging element is preferably a spring element. Any number of engaging elements may be provided. The engaging element is in particular a latching hook or a snap hook, which engages in the wave valley of the corrugation of the corrugated hose. An interlocking connection is established by at least two connection partners, here the corrugation, in particular the wave valley, and the engaging element, engaging in or behind one another.

When the coupling apparatus is brought from the unlocked state into the locked state, the engaging element is preferably moved along the longitudinal direction or along the axis of symmetry into the receptacle part so that the engaging element is arranged in the receptacle region. This in particular means that the rotational movement of the locking part in relation to the receptacle part is converted into a linear movement of the engaging element along the longitudinal direction or along the axis of symmetry. The locking part may also move linearly along the longitudinal direction into the receptacle part. This is however not necessarily required. The coupling apparatus may have a gear device, which converts the rotational movement of the locking part in relation to the receptacle part into the linear movement or axial movement of the engaging element into or out of the receptacle region. A rotational movement is however not necessarily required. As previously mentioned, a linear movement may also be provided.

In the locked state, the receptacle region prevents a movement of the engaging element outward in the radial direction away from the corrugated hose and thus out of the corrugation. This means that it is not possible in the locked state to pull the corrugated hose out of the coupling apparatus. In the unlocked state, the engaging element is arranged outside of the receptacle region so that the engaging element can be deformed outward away from the corrugated hose as viewed in the radial direction. This means that in the unlocked state, the corrugated hose can be pulled out of the coupling apparatus, wherein the engaging element is resiliently deformed and glides over the corrugation.

The unlocked state is preferably a preassembled state or may be referred to as such. In that the latching hook engages in the first latching rib in the unlocked state, the locking part is fixed on the receptacle part so that the two components are captively connected to one another. When the coupling apparatus is brought from the unlocked state into the locked state, the latching hook glides over the second latching rib and latches or snaps into or behind it. In the locked state, the engagement of the latching hook in the second latching rib prevents the connection between the locking part and the receptacle part from being released. Unintentional opening of the coupling apparatus is thus reliably prevented. Preferably provided are two latching hooks, which are arranged at an offset of 180° to one another. The number of latching hooks is however arbitrary. The latching hooks are designed as snap hooks or may be referred to as such. The latching hooks are resiliently deformable. The first latching rib and the second latching rib are designed as ribs extending around a base body of the locking part.

According to one embodiment, the locking part moves along the axis of symmetry into the receptacle part when the coupling apparatus is brought from the unlocked state into the locked state.

In reverse, the locking part moves along the axis of symmetry out of the receptacle part when the coupling apparatus is brought from the locked state into the unlocked state. This means in particular that the locking part is arranged at least in sections within the receptacle part. As previously mentioned, it is however not necessarily required that the locking part moves into the receptacle part when the coupling apparatus is brought from the unlocked state into the unlocked state. The coupling apparatus may also be designed such that only the engaging element is moved into the receptacle region when the locking part rotates relative to the receptacle part.

According to a further embodiment, the receptacle part has an engaging portion, wherein the locking part has a mating engaging portion, which interlockingly engages in the engaging portion, and wherein the engaging portion and the mating engaging portion interact such that the engaging element moves along the axis of symmetry into the receptacle region during the rotational movement of the locking part relative to the receptacle part.

In particular, the receptacle part and the locking part are rotatably mounted on one another by means of the engaging portion and the mating engaging portion. In particular, the engaging portion and the mating engaging portion interact such that the locking part moves along the axis of symmetry into the receptacle part during the rotational movement of the locking part relative to the receptacle part. For example, the engaging portion is an internal thread and the mating engaging portion is an external thread. The threads preferably respectively have two to five windings. The engaging portion and the mating engaging portion may also be parts of a bayonet closure or the like. The engaging portion and the mating engaging portion may be designed in any way, wherein the engaging portion and the mating engaging portion however have the property of converting the rotational movement of the locking part relative to the receptacle part into a linear movement along the axis of symmetry or along the longitudinal direction. The engaging portion and the mating engaging portion may thus in particular form the previously mentioned gear device of the coupling apparatus. The gear device may be any type of gears that are suitable to convert the rotational movement of the locking part in relation to the receptacle part into an axial movement or linear movement of the locking part along the longitudinal direction and relative to the receptacle part. It is in particular sufficient if the gear device converts the rotational movement of the locking part in relation to the receptacle part into an axial movement or linear movement of the engaging element along the longitudinal direction or along the axis of symmetry.

According to a further embodiment, the locking part is mounted on the receptacle part so as to be rotatable about the axis of symmetry.

For this purpose, a thread or a screw connection may be provided. Alternatively, a bayonet closure may also be provided. Instead of a rotatable mounting, the locking part may however also be mounted on the receptacle part so as to be displaceable linearly.

According to a further embodiment, the receptacle region has a conical geometry at least in sections.

The receptacle region in particular has a cylindrical geometry at least in sections and a conical, cone-shaped, or frustoconical geometry in sections. The term "conical geometry" herein is understood to mean a geometry that is rotationally symmetrical with respect to the axis of symmetry and frustoconically tapered. The conical geometry may therefore also be referred to as a frustoconical geometry.

According to a further embodiment, the coupling apparatus furthermore comprises a sealing part, received in the receptacle region, for receiving the corrugated hose.

The sealing part is in particular suitable for receiving the end portion of the corrugated hose. The sealing part is preferably manufactured from an elastically deformable plastic material or from a rubber material. For example, the sealing part may be manufactured from a thermoplastic elastomer (TPE), in particular from a thermoplastic polyurethane (TPU), an ethylene-propylene-diene rubber (EPDM), or the like. The sealing part may be laid or pushed into the receptacle region. The sealing part preferably has a larger diameter than the receptacle region so that the sealing part must be pressed into the receptacle region. Alternatively, the sealing part may be injection-molded directly onto the locking part in a multi-component injection-molding method. Due to the conical geometry of the receptacle region at least in sections, the sealing part is elastically deformed when it is introduced into the receptacle region, whereby it rests in a circumferentially fluid-tight manner on the receptacle region.

According to a further embodiment, the engaging element in the locked state presses the corrugated hose along the axis of symmetry with an end portion of the corrugated hose on the face side against the sealing part.

In particular, the engaging element has an end face that rests on a wave flank of the corrugation of the corrugated hose. The end face is preferably oriented orthogonally to the axis of symmetry or orthogonally to the longitudinal direction. In particular, the wave flank is preferably also oriented orthogonally to the axis of symmetry or orthogonally to the longitudinal direction. The end face preferably presses the corrugated hose, in particular the end portion thereof, against a cover portion of the sealing part, whereby the latter is elastically deformed. The corrugated hose is thus sealed on the face side in a fluid-tight manner with respect to the sealing part. By means of the rotational movement of the locking part in relation to the receptacle part, the contact pressure of the corrugated hose on the sealing part can thus be adjusted. A high contact pressure can advantageously be achieved. During the rotational movement, the locking part can be screwed into the receptacle part. This is however not necessarily required. The movement of the locking part along the axis of symmetry into the receptacle part when the coupling apparatus is brought from the unlocked state into the locked state may also be realized by means of a bayonet closure or the like.

According to a further embodiment, the sealing part has a tubular base body, around which a rib extends on the outside, and a cover portion which has an aperture and closes the base body on the face side.

In the tubular base body, the end portion of the corrugated hose is in particular received. The rib in particular has an arcuately curved geometry. The rib is elastically deformed when the sealing part is introduced into the receptacle region. This ensures sufficient sealing of the sealing part with respect to the receptacle region due to the conical geometry of the receptacle region on the one hand and due to the circumferential rib on the other hand. In particular, the corrugated hose is pressed on the face side against the cover portion. The aperture in the cover portion is preferably circular. The aperture in particular has a smaller diameter than the corrugated hose at the wave valleys thereof. This prevents the corrugated hose from sliding through the aperture.

According to a further embodiment, the locking part has a plurality of engaging elements, which are arranged regularly or irregularly distributed about the axis of symmetry, wherein the engaging elements together form a tubular geometry.

The number of engaging elements is arbitrary. For example, four such engaging elements are provided. The engaging elements together form a cylindrical, in particular circular-cylindrical, geometry. This means that the engaging elements are arcuate, in particular circular arcuate. In particular, the engaging elements are portions of a cylinder, in particular a circular cylinder. The tubular geometry formed by the engaging elements in particular has a smaller diameter than the receptacle region. In the locked state, this tubular geometry is received in the receptacle region. In the unlocked state, the tubular geometry is in particular situated outside of the receptacle region.

According to a further embodiment, intermediate spaces are provided between the engaging elements so that the engaging elements and the intermediate spaces are arranged alternately.

The intermediate spaces are preferably narrower than the engaging elements as viewed along the circumferential direction of the coupling apparatus. The intermediate spaces may also be broader than or as broad as the engaging elements as viewed along the circumferential direction. Each engaging element can be arranged between two intermediate spaces, or vice versa.

According to a further embodiment, the locking part has a base body, wherein the engaging element is connected to the base body by means of a constriction functioning as a resiliently deformable hinge.

This means that the constriction of the engaging element is deformed when the corrugated hose is pushed into the coupling apparatus. The constriction may be a so-called film hinge. In particular, such a constriction is assigned to each engaging element.

According to a further embodiment, a gap extending annularly around the axis of symmetry is provided between the base body and the engaging element.

In particular, the engaging elements are deformed or moved radially outward into the circumferential gap when the corrugated hose is pushed into the coupling apparatus. The gap extends behind the mating engaging portion of the locking part as viewed along the longitudinal direction.

According to a further embodiment, the locking part has a funnel-shaped insertion opening for inserting the corrugated hose.

This simplifies the mounting of the corrugated hose on the coupling apparatus. The insertion opening may also be referred to as conical or frustoconical.

Furthermore proposed is a corrugated hose arrangement having such a coupling apparatus and a corrugated hose, which is received in the coupling apparatus.

The corrugated hose is in particular received in the receptacle part. However, in doing so, the corrugated hose is guided through the locking part. The corrugated hose arrangement is preferably used in the field of motor vehicle technology. For example, the corrugated hose arrangement can be used as fuel line, windshield washer line, headlamp cleaner line, sensor cleaner line, or the like. The corrugated hose arrangement can, however, also be used in any other field. For example, the corrugated hose arrangement can be used in building technology or for machine tools.

According to one embodiment, the corrugated hose has a corrugation with wave crests and wave valleys arranged alternately along the axis of symmetry, wherein the corrugation has connection ribs which extend along the axis of symmetry and connect adjacent wave crests to one another.

Two such connection ribs are preferably assigned to each wave valley and are arranged opposite one another. This means that the connection ribs of a wave valley are arranged at an offset of a first circumferential angle of 180° to one another. The connection ribs of adjacent wave valleys are in turn arranged at an offset of a second circumferential angle of 90° to one another. This achieves on the one hand that the corrugated hose is highly flexible and can be deformed well. The connection ribs however prevent the corrugated hose from elongating along the longitudinal direction or along the axis of symmetry. The corrugated hose is preferably used in the field of motor vehicle technology. For example, the corrugated hose can be a windshield washer line, a filling pipe, a fuel line, or the like, or also part of a windshield washer line, a filling pipe, a fuel line, or the like. This means that the corrugated hose is preferably itself a medium carrier or fluid carrier. The medium or fluid may be a liquid or a gas. The corrugated hose may however also be suitable for receiving a multitude of cables and lines. In this case, the corrugated hose is suitable as cable sheathing. The cables may, for example, be single-phase cables, multi-phase cables, coaxial cables, or the like. The lines may be fluid lines, such as gasoline lines, diesel lines, kerosene lines, hydraulic lines, or pneumatic lines.

The embodiments and features described for the coupling apparatus apply accordingly to the proposed corrugated hose arrangement, and vice versa.

"A" herein is not necessarily to be understood as restrictive to precisely one element; rather, a plurality of elements, such as two, three, or more elements, may also be provided. Any other numeral used herein is also not to be understood as meaning that a restriction to precisely the mentioned number of elements is given. Rather, upward and downward deviations in terms of numbers are possible, unless indicated otherwise.

Further possible implementations of the coupling apparatus and/or of the corrugated hose arrangement also include not explicitly mentioned combinations of features or embodiments described above or below with respect to the exemplary embodiments. In this respect, the person skilled in the art will also add individual aspects as improvements or additions to the respective basic form of the coupling apparatus and/or of the corrugated hose arrangement.

Further advantageous embodiments and aspects of the coupling apparatus and/or the corrugated hose arrangement are the subject matter of the dependent claims and of the exemplary embodiments of the coupling apparatus and/or of the corrugated hose arrangement described below. The coupling apparatus and/or corrugated hose arrangement are explained in more detail below based on preferred embodiments with reference to the appended figures.

DETAILED DESCRIPTION

Unless indicated otherwise, identical or functionally identical elements are provided with the same reference signs in the figures. It should furthermore be noted that the illustrations in the figures are not necessarily true to scale.

Figure 1:
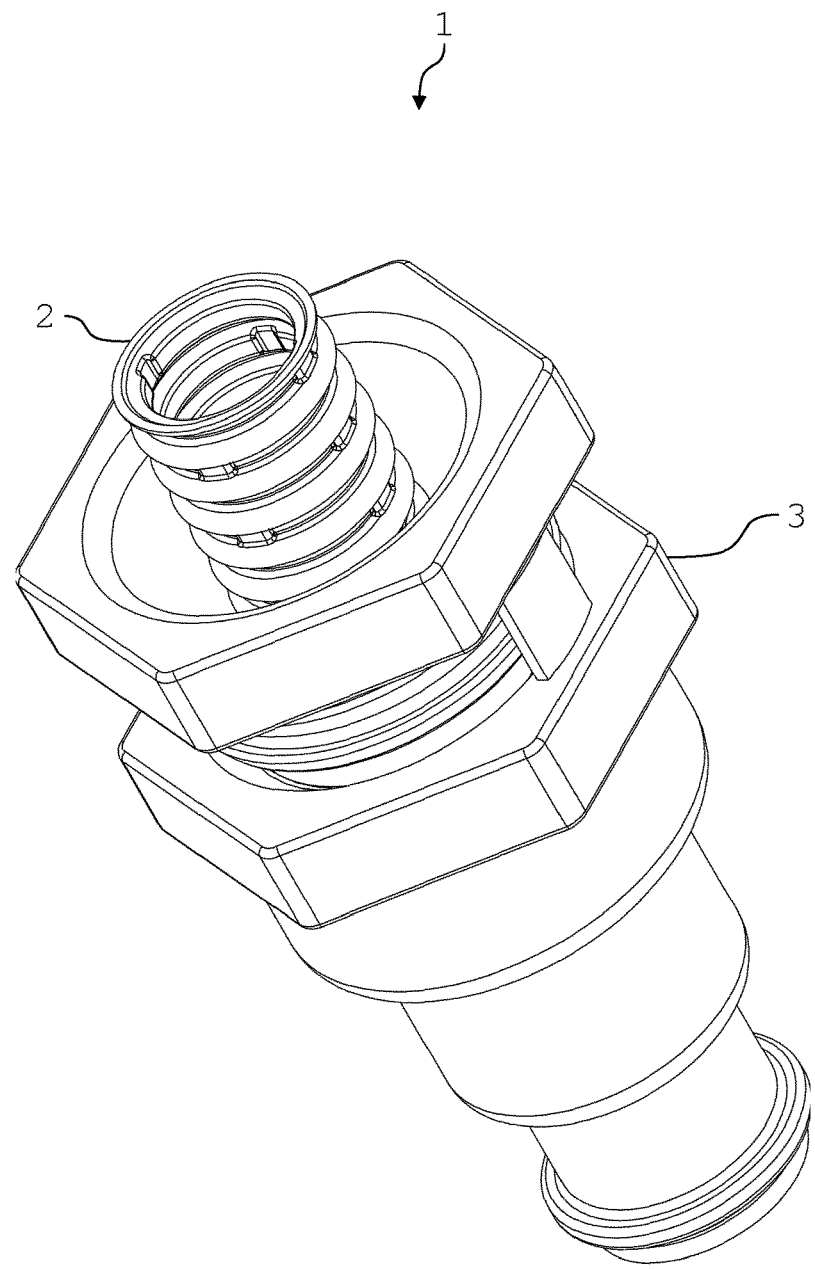
FIG. 1 shows a schematic perspective view of an embodiment of a corrugated hose arrangement.
Figure 2:
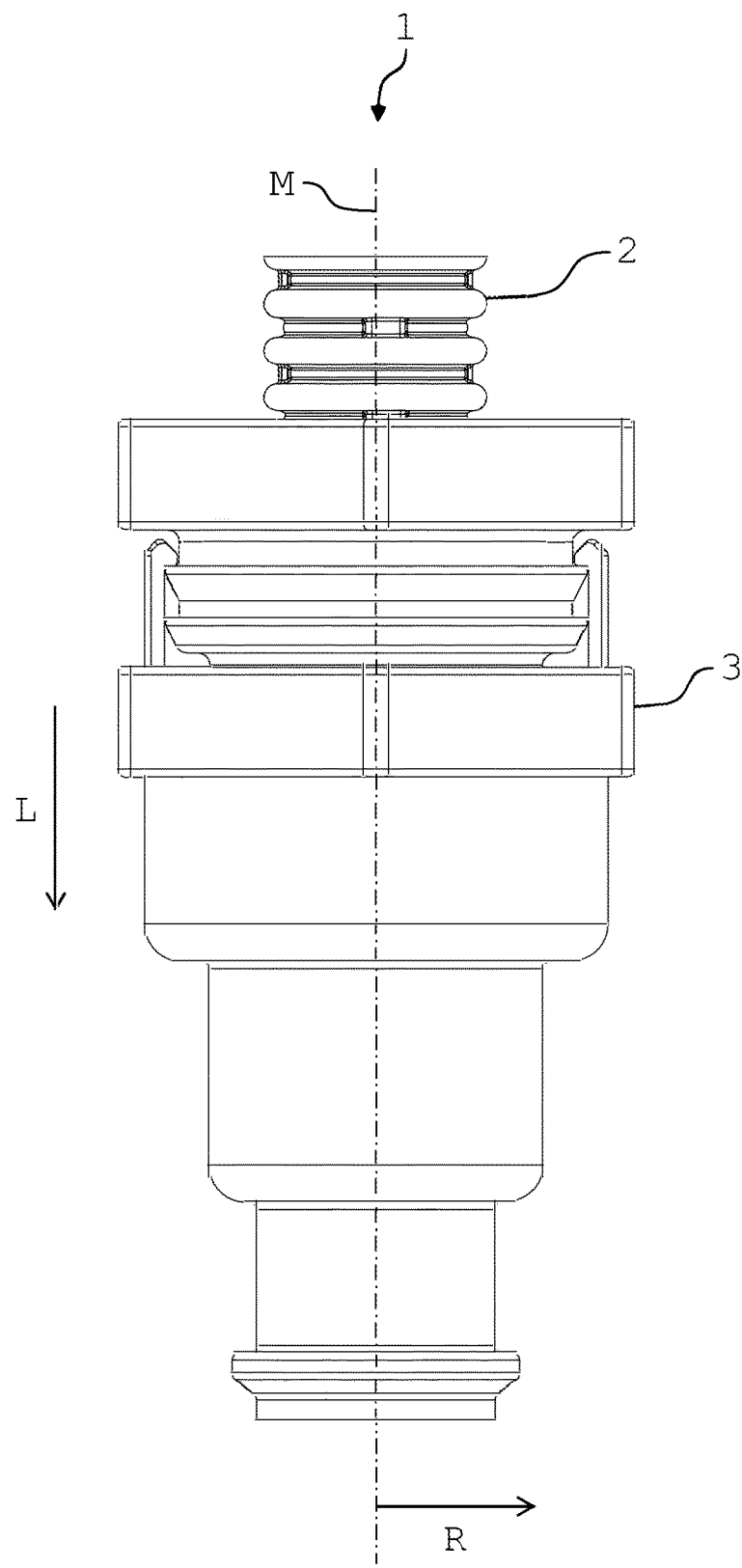
FIG. 2 shows a schematic lateral view of the corrugated hose arrangement according to FIG. 1.
Figure 3:
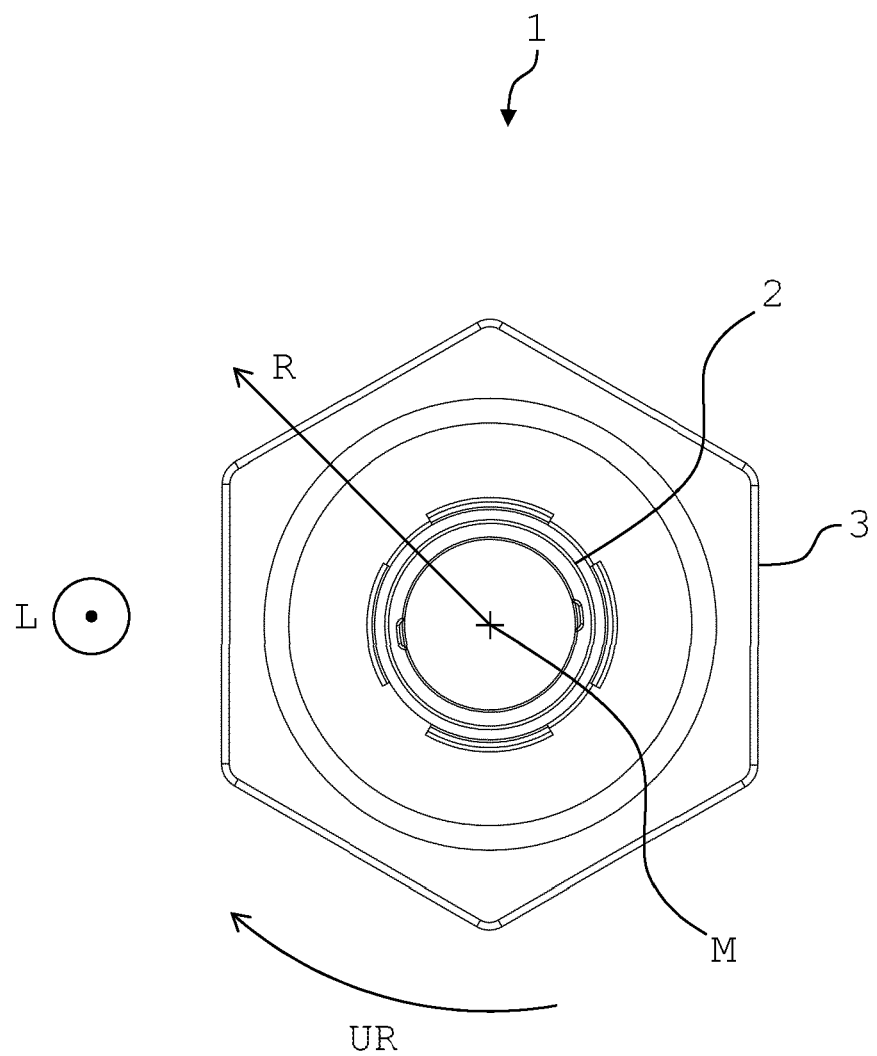
FIG. 3 shows a schematic front view of the corrugated hose arrangement according to FIG. 1.

FIG. 1 shows a schematic perspective view of an embodiment of a corrugated hose arrangement 1. FIG. 2 shows a schematic lateral view of the corrugated hose arrangement 1, and FIG. 3 shows a schematic front view of the corrugated hose arrangement 1. Below, reference is simultaneously made to FIGS. 1 to 3.

The corrugated hose arrangement 1 comprises a corrugated hose 2 and a coupling apparatus 3 fastened to the corrugated hose 2. The coupling apparatus 3 may also be referred to as a coupling or connection apparatus or even as a connector or connecting apparatus. By means of the coupling apparatus 3, the corrugated hose 2 can be connected to other components, such as plugs, hoses, or the like. The corrugated hose 2 is a continuous product and can have any length.

The corrugated hose arrangement 1 is preferably used in the field of motor vehicle technology. For example, the corrugated hose arrangement 1 can be used as fuel line, windshield washer line, headlamp cleaner line, sensor cleaner line, or the like. The corrugated hose arrangement 1 can, however, also be used in any other field. For example, the corrugated hose arrangement 1 can be used in building technology or for machine tools.

A center axis or axis of symmetry M is assigned to the corrugated hose arrangement 1. The corrugated hose arrangement 1 preferably has a rotationally symmetrical structure with respect to the axis of symmetry M. A longitudinal direction L is furthermore assigned to the corrugated hose arrangement 1. The longitudinal direction L is oriented in parallel to the axis of symmetry M or corresponds thereto. The longitudinal direction L may also be referred to as the axial direction of the corrugated hose arrangement 1. The longitudinal direction L in the orientation of FIG. 2 is oriented from top to bottom. The longitudinal direction L may however also be oriented reversely.

A radial direction R is furthermore assigned to the corrugated hose arrangement 1 and is oriented away from the axis of symmetry M. The radial direction R is positioned orthogonally to the axis of symmetry M. The corrugated hose arrangement 1 moreover has a circumferential direction UR, which may be oriented clockwise or counterclockwise. As FIG. 3 shows, the circumferential direction UR is oriented clockwise. The circumferential direction UR is oriented around the axis of symmetry M. The circumferential direction UR may also be referred to as the peripheral direction of the corrugated hose arrangement 1.

Figure 4:
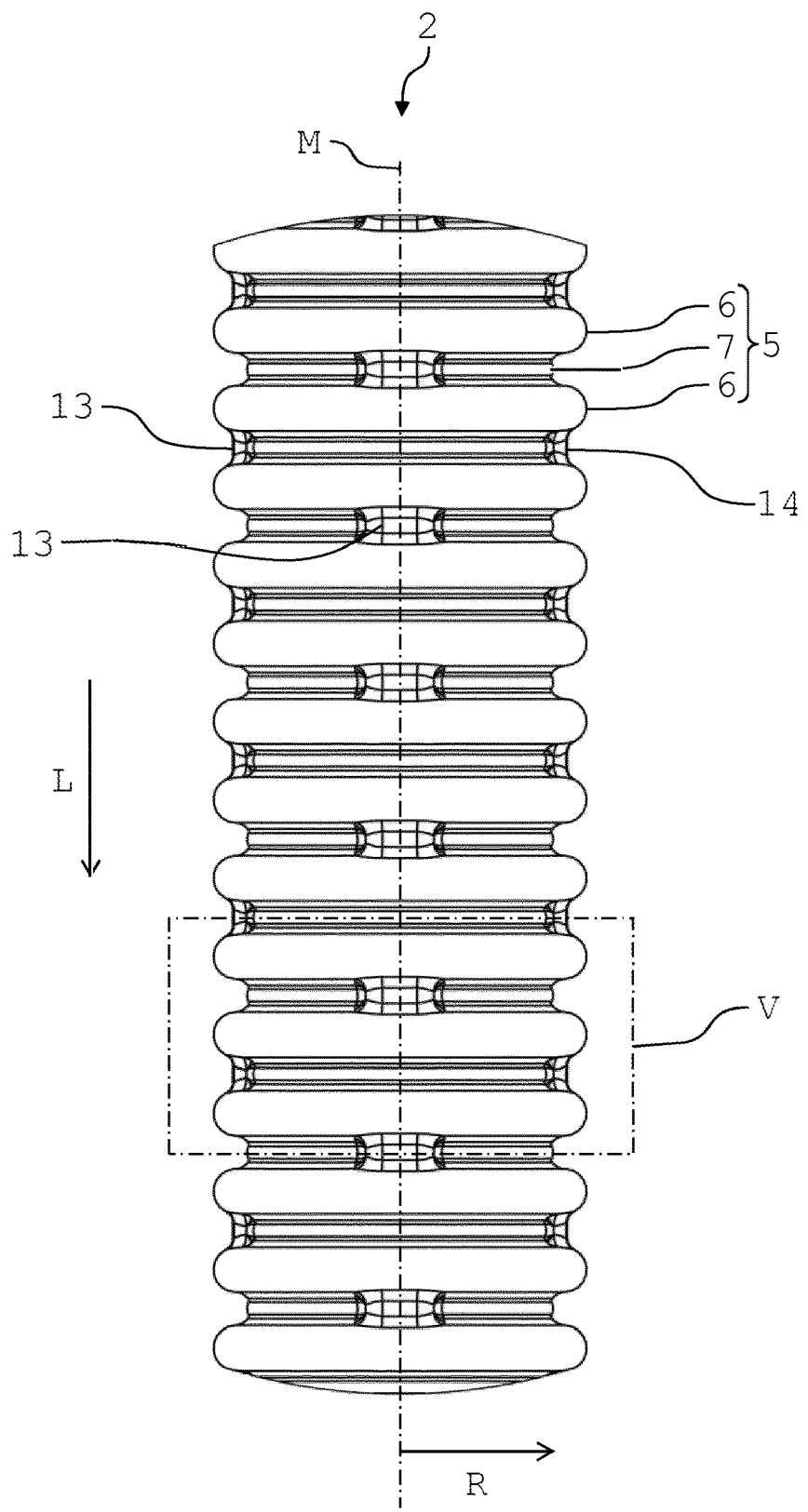
FIG. 4 shows a schematic view of an embodiment of a corrugated hose for the corrugated hose arrangement according to FIG. 1.
Figure 5:
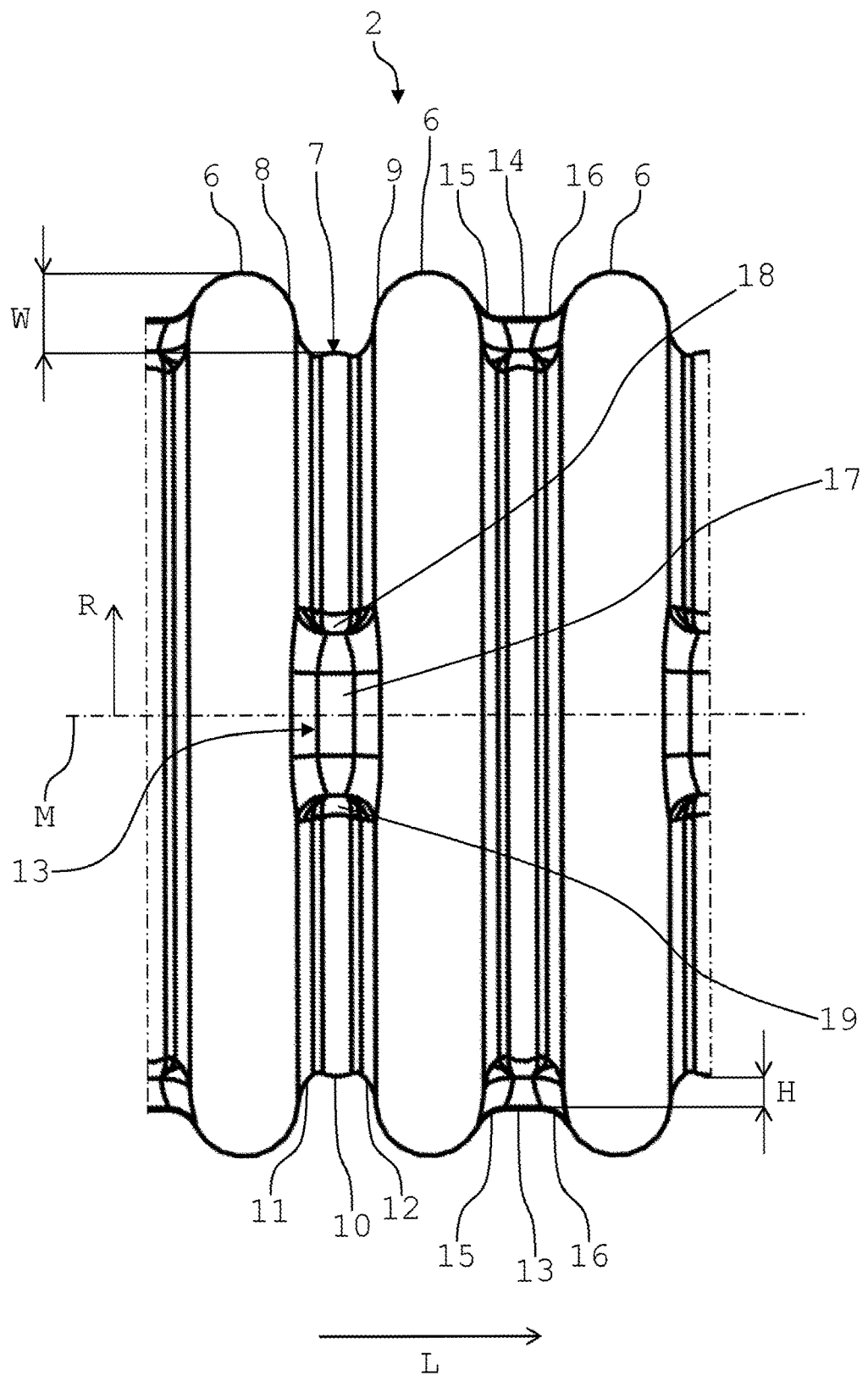
FIG. 5 shows the detailed view V according to FIG. 4.
Figure 6:
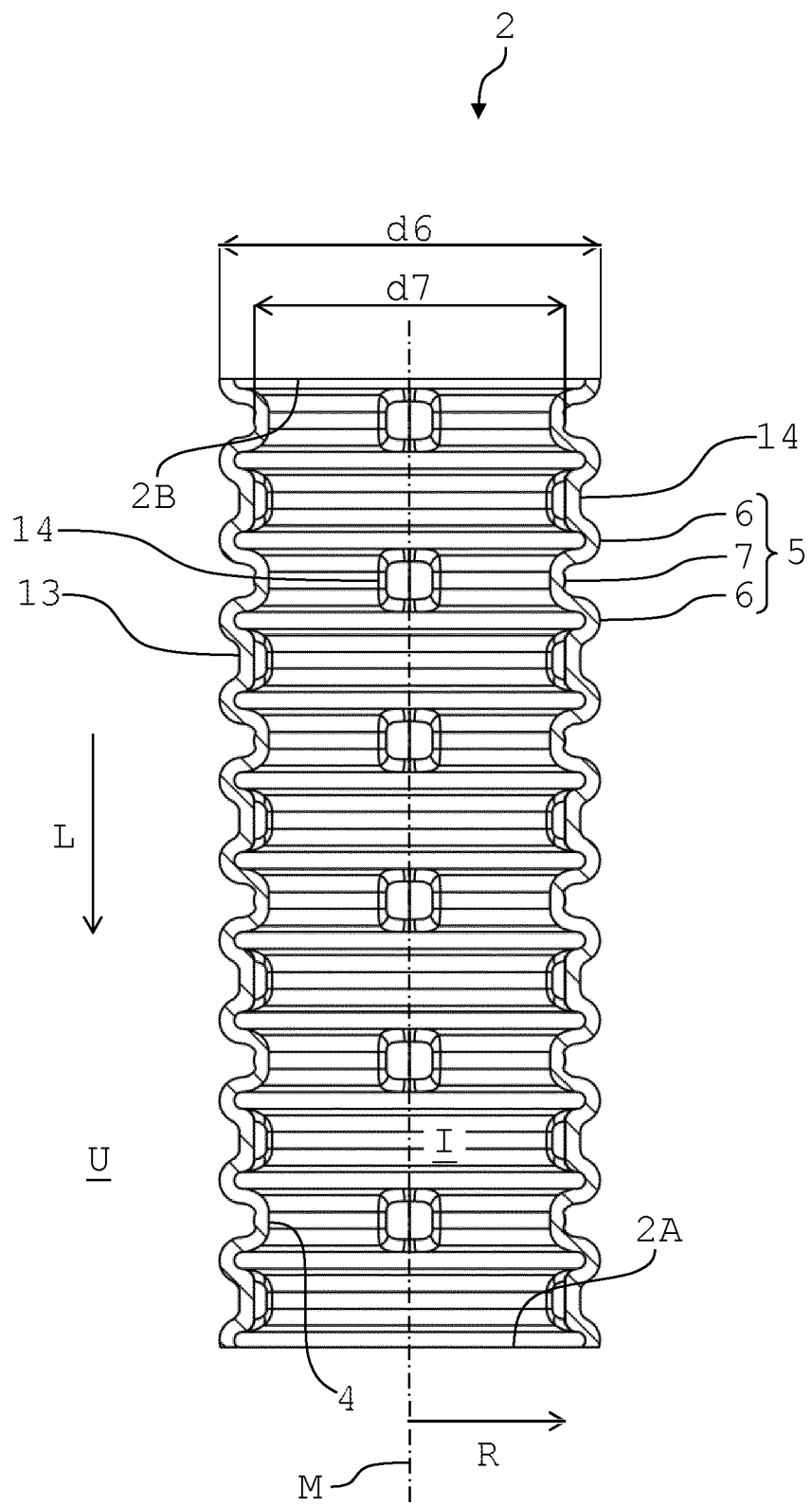
FIG. 6 shows a schematic sectional view of the corrugated hose according to FIG. 4.

FIG. 4 shows a schematic view of an embodiment of the corrugated hose 2. FIG. 5 shows the detailed view V according to FIG. 4. FIG. 6 shows a schematic sectional view of the corrugated hose 2. Below, reference is simultaneously made to FIGS. 4 to 6.

The corrugated hose 2 is manufactured from a plastic material. The plastic material may, for example, be polyoxymethylene (POM), polypropylene (PP), or another suitable plastic material. The corrugated hose 2 may also be referred to as a corrugated pipe or is a corrugated pipe. The corrugated hose 2 is preferably produced by means of an extrusion method. The corrugated hose 2 may also be manufactured from different plastic materials. In this case, the corrugated hose 2 may, for example, be produced by means of a multi-component extrusion method and/or by means of a multi-layer extrusion method. When the corrugated hose 2 is produced in a multi-layer extrusion method, it has a wall structure in layers. The layers may have different plastic materials. The multi-layer extrusion method is thus an embodiment of a multi-component extrusion method.

The corrugated hose 2 is a one-piece component, in particular a component made of a single piece of material. "One-piece" or "single piece" in this respect means that the corrugated hose 2 is not constructed of a plurality of individual elements or components but of one continuous unit. However, this does not rule out that the corrugated hose is constructed of different plastic materials. In this case, the corrugated hose 2 may, for example, be produced by means of a multi-component extrusion method and/or by means of a multi-layer extrusion method. "Single piece of material" herein means that the corrugated hose 2 is manufactured continuously from the same plastic material. At the ends, the corrugated hose 2 comprises a first end portion 2A and a second end portion 2B.

The corrugated hose 2 is preferably a fluid line or media line. The fluid or medium may, for example, be a gas, water, fuel, oil, or any other liquid. For example, the corrugated hose 2 may be an air line or a gas line. The corrugated hose 2 may thus itself be a fluid carrier. The corrugated hose 2 may however also be suitable for receiving a multitude of cables or lines. In this case, the corrugated hose 2 is suitable as cable sheathing. The cables may, for example, be single-phase cables, multi-phase cables, coaxial cables, or the like. The lines may be fluid lines, such as gasoline lines, diesel lines, kerosene lines, hydraulic lines, or pneumatic lines.

The corrugated hose 2 has a rotationally symmetrical structure with respect to the axis of symmetry M. The corrugated hose 2 may be curved. However, as viewed along the longitudinal direction L, the corrugated hose 2 is preferably stiff and in particular not foldable or telescopic. This means that the corrugated hose 2 is non-foldable or non-telescopic along the longitudinal direction L. The terms "non-foldable" or "non-telescopic" are in particular to be understood as meaning that the corrugated hose 2, in particular due to the material and/or due to the geometry, cannot be extended or compressed or can at least only be minimally extended and compressed along the longitudinal direction L. This means that the corrugated hose 2 preferably has a high axial stiffness along the longitudinal direction L or along the axis of symmetry M.

The corrugated hose 2 comprises a wall 4, which extends completely around the axis of symmetry M in the circumferential direction UR (FIG. 6) and toward which the radial direction R points. The wall 4 encloses an internal space I of the corrugated hose 2. The internal space I is separated by means of the corrugated hose 2, in particular by means of the wall 4, from an environment U thereof. The circumferential direction UR not shown in FIGS. 4 to 6 is oriented along the wall 4.

The corrugated hose 2 comprises a corrugation 5 that is molded onto the wall 4 and has wave crests 6 and wave valleys 7 alternating in the longitudinal direction L. The wave valleys 6 and wave crests 7 are arranged such that one wave valley 7 is respectively arranged between two wave crests 6 and one wave crest 6 is respectively arranged between two wave valleys 7. The corrugation 5 may have a sinusoidal profile as shown in FIGS. 4 to 6. Alternatively, the corrugation 5 may however also have a rectangular profile. The wave crests 6 and the wave valleys 7 are provided on the corrugated hose 2 both on the outside, i.e., facing the environment U, and on the inside, i.e., facing the internal space I. For example, the wave crests 6 and the wave valleys 7 can be molded onto the corrugated hose 2 by means of a so-called corrugator after extrusion of the corrugated hose 2.

As FIG. 5 shows, the wave crests 6 are connected to the wave valleys 7 by means of wave flanks 8, 9. Two wave flanks 8, 9 are assigned to each wave crest 6 and each wave valley 7. The wave flanks 8, 9 preferably extend orthogonally to the axis of symmetry M. The wave flanks 8, 9 may however also be inclined relative to the axis of symmetry M. The wave flanks 8, 9 are part of the corrugation 5. Each wave valley 7 comprises a rib 10 that extends circumferentially around the corrugated hose 2 and is in particular arranged centrally between two adjacent wave crests 6. The rib 10 may completely extend circumferentially around the corrugated hose 2. The rib 10 may however also be interrupted circumferentially.

Transition regions 11, 12, which are designed as fillets, between the rib 10 and the wave flanks 8, 9 function as bending points during bending of the corrugated hose 2. The wave flanks 8, 9 transition into the rib 10 by means of the transition regions 11, 12. The rib 10 extends on the outside of the corrugated hose 2 into the environment U and away from the internal space I. The rib 10 is curved arcuately, in particular circular-arcuately, into the environment U. On the inside, i.e., facing the internal space I, the wave valleys 7 are cylindrical, in particular circular cylindrical. This means that the wave valleys 7 facing the internal space I have no or at least only a minimal curvature.

The corrugated hose 2 has an outer diameter or diameter d6 at the wave crests 6 and an outer diameter or diameter d7 at the wave valleys 7, wherein the diameter d6 is greater than the diameter d7. The corrugation 5 also has a wave height W. The wave height W is defined as a distance between the wave crests 6 and the wave valleys 7 as viewed in the radial direction R. The wave height W is in particular half the difference of the diameters d6, d7. The wave height W is in particular defined as a distance of a respective wave valley 7, in particular of an outer contour of the corresponding rib 10 of the wave valley 7, from the wave crest 6, in particular from an outer contour of the wave crest 6, as viewed in the radial direction R.

The corrugated hose 2 moreover comprises connection ribs 13, 14 extending along the longitudinal direction L. The connection ribs 13, 14 are respectively arranged between two adjacent wave crests 6 in a wave valley 7 and connect wave flanks 8, 9 assigned to the adjacent wave crests 6 to one another. In particular, a first connection rib 13 and a second connection rib 14 are assigned to each wave valley 7. The connection ribs 13, 14 respectively transition by means of fillets 15, 16 into the wave flanks 8, 9 or into the wave crests 6.

The connection ribs 13, 14 are hollow so that the connection ribs 13, 14 can function as a fluid connection between two adjacent wave crests 6. As a result, liquid remaining in the wave crests 6 can be prevented or at least reduced. This means that dead zones in the corrugated hose 2 are reduced. The ribs 10 are interrupted at the connection ribs 13, 14.

The connection ribs 13, 14 comprise an outer face 17, which is cylindrical, in particular circular cylindrical. The outer face 17 is thus curved, in particular curved circular-cylindrically. This means that the outer faces 17 of all connection ribs 13, 14 lie on a cylinder, in particular on a circular cylinder. The connection ribs 13, 14 in this case preferably all have the same height as viewed in the radial direction R. The circular cylinder has a rotationally symmetrical structure with respect to the axis of symmetry M.

The connection ribs 13, 14 may however also have different heights with respect to the radial direction R so that the outer faces 17 do not lie on a circular cylinder but on different circular cylinders. The connection ribs 13, 14 transition into the wave valleys 7 by means of fillets 18, 19. The outer faces 17 may however also be planar or flat and not have a cylindrical curvature. In this case, the connection ribs 13, 14 are preferably cuboidal or cubical.

The first connection rib 13 and the second connection rib 14 of each wave valley 7 are arranged at an offset of a first circumferential angle of 180° to one another in the circumferential direction UR. This means that the first connection rib 13 and the second connection rib 14 of each wave valley 7 are arranged opposite one another. The connection ribs 13, 14 of two adjacent wave valleys 7 are in turn arranged at an offset to one another in the circumferential direction UR. The connection ribs 13, 14 of two adjacent wave valleys 7 are in particular arranged at an offset of a second circumferential angle of 90° to one another along the circumferential direction UR.

The connection ribs 13, 14 are thus arranged such that the connection ribs 13, 14 in each wave valley 7 are arranged at an offset of the first circumferential angle of 180° to one another, and that the connection ribs 13, 14 of adjacent wave valleys 7 are arranged at an offset of the second circumferential angle of 90° to one another.

In that the connection ribs 13, 14 of two adjacent wave valleys 7 are arranged at an offset of the second circumferential angle of 90° to one another, the flexibility of the corrugated hose 2 is not negatively or only insignificantly negatively influenced by the connection ribs 13, 14. This means that the flexibility of the corrugated hose 2 is retained. Very narrow rates of bending can thus be achieved. The flexibility of the corrugated hose 2 thus does not differ or differs only insignificantly from a corrugated hose without such connection ribs 13, 14.

The connection ribs 13, 14 have a height H as viewed in the radial direction R. The height H is defined as a distance of a respective wave valley 7, in particular from an outer contour of the corresponding rib 10, to the respective outer face 17 of the connection rib 13, 14 as viewed in the radial direction R. Particularly preferably, the height H is less than the wave height W. For example, the height H may be half the wave height W. The height H may however also be equal to the wave height W. All connection ribs 13, 14 may have the same height H. The connection ribs 13, 14 may however also have different heights H.

In that the connection ribs 13, 14 are provided, a longitudinal elongation of the corrugated hose 2 in the longitudinal direction L can be minimized by the action of the operating pressure of the fluid or medium to be conveyed. In particular, a minimum longitudinal elongation of the corrugated hose 2 can be achieved. However, due to the offset arrangement of the connection ribs 13, 14 of adjacent wave valleys 7, the flexibility of the corrugated hose 2 is only restricted a little so that very narrow bending radii are possible. Moreover, by the provision of connection ribs 13, 14, which can serve as fluid connection between adjacent wave crests 6, the production of dead zones in the internal space I of the corrugated hose 2 can be reliably reduced.

Let us now return to the coupling apparatus 3 according to FIGS. 1 to 3. The coupling apparatus 3 comprises a receptacle part 20 shown in FIGS. 7 and 8. The receptacle part 20 is suitable for receiving the corrugated hose 2, in particular one of the end portions 2A, 2B of the corrugated hose 2. The receptacle part 20 has a rotationally symmetrical structure with respect to the axis of symmetry M. The receptacle part 20 is manufactured from a plastic material.

For example, the receptacle part 20 may be manufactured from POM, PP, or another suitable plastic material. The receptacle part 20 may also be manufactured from different plastic materials. In particular, the receptacle part 20 is a plastic injection-molded component. The receptacle part 20 may also be a plastic multi-component injection-molded component. The receptacle part 20 may however also be manufactured from a metallic material, such as an aluminum alloy or a steel alloy.

Figure 7:
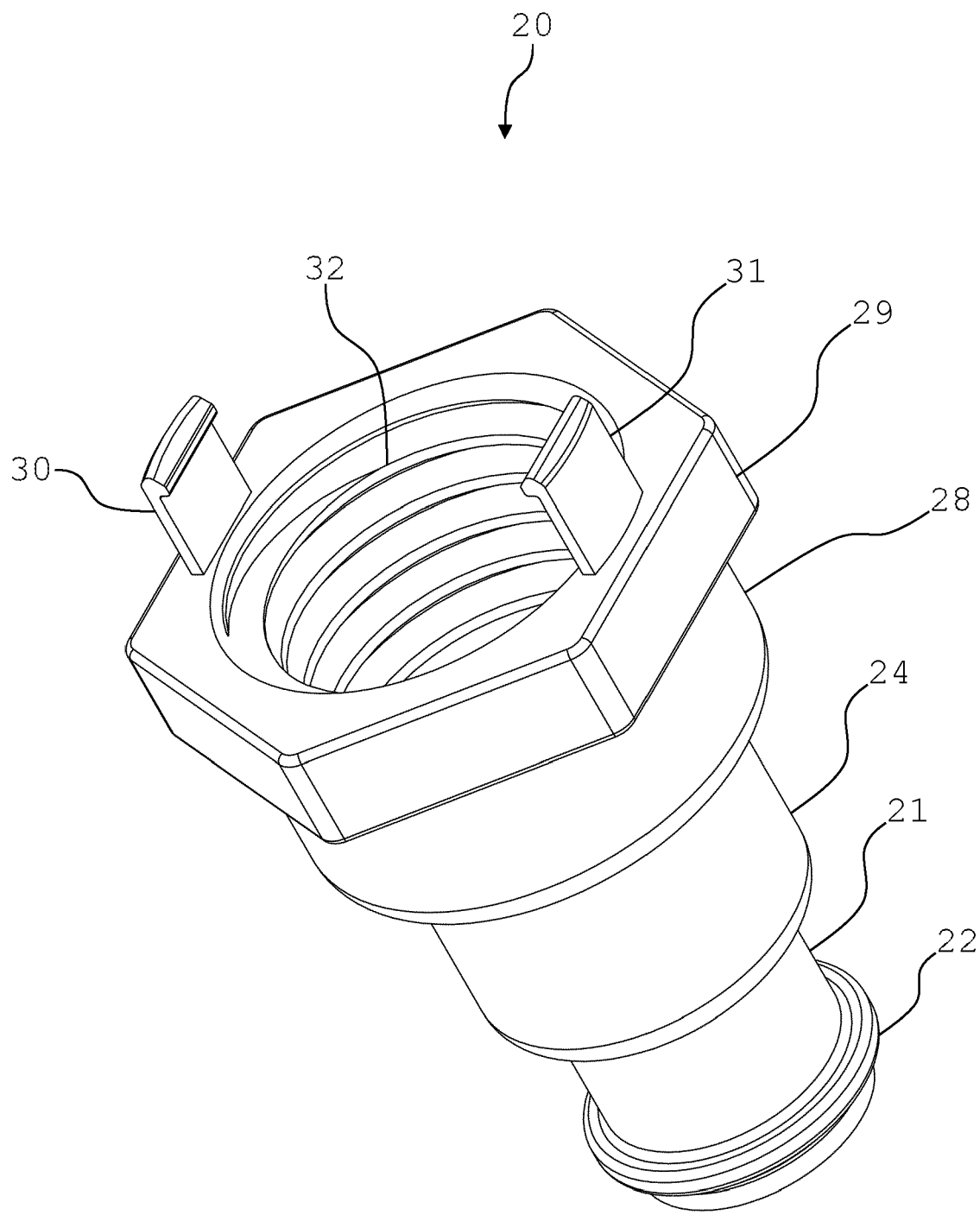
FIG. 7 shows a schematic perspective view of an embodiment of a receptacle part of a coupling apparatus for the corrugated hose arrangement according to FIG. 1.
Figure 8:
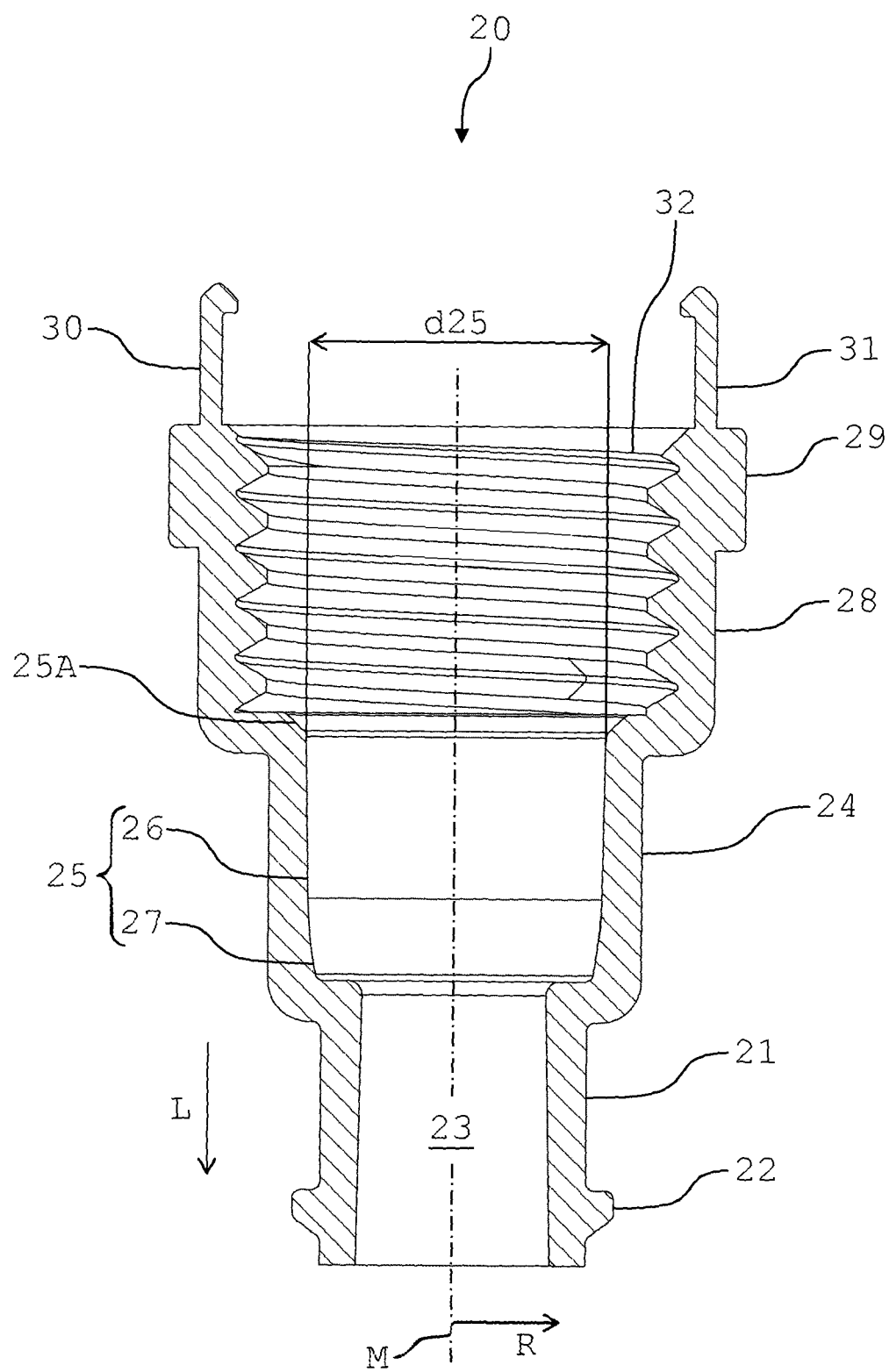
FIG. 8 shows a schematic sectional view of the receptacle part according to FIG. 7.

The receptacle part 20 comprises a tubular coupling portion 21 having a collar 22 extending annularly around the axis of symmetry M. The coupling portion 21 is hollow and is completely perforated by an aperture 23. By means of the coupling portion 21, the receptacle part 20 can, for example, be connected to a plug, a hose, or the like. For this purpose, the latter can be pushed onto the coupling portion 21. The collar 22 prevents the plug or hose from sliding from the coupling portion 21. The coupling portion 21 is shown in FIGS. 7 and 8 as the "male variant." This means that the coupling portion 21 can be inserted into another component. The coupling portion 21 may however also be designed as the "female variant" (not shown). In this case, a component can be inserted into the coupling portion 21.

The coupling portion 21 is adjoined in one piece, in particular in a single piece of material, by a receptacle portion 24. The receptacle portion 24 is likewise hollow. The receptacle portion 24 comprises a receptacle region 25 perforating the receptacle portion 24 and having a diameter d25. The diameter d25 may taper in the direction of the coupling portion 21. The receptacle region 25 is connected to the aperture 23. The receptacle region 25 preferably comprises a cylindrical first cavity 26 and a second cavity 27, which adjoins the cylindrical first cavity 26 and is conical or frustoconical. The receptacle region 25 transitions into a chamfer 25A. The chamfer 25A is preferably not part of the receptacle region 25.

The coupling portion 24 is adjoined in one piece, in particular in a single piece of material, by a tubular base body 28. A grip region 29 is molded onto the base body 28 and can be gripped by a tool, e.g., by an open-end wrench. The grip region 29 may, for example, be an outer hexagon. Alternatively, the grip region 29 may also be an outer square or the like.

On the upper side, a first latching hook 30 and a second latching hook 31 extend out of the base body 28, in particular out of the grip region 29. The number of latching hooks 30, 31 is arbitrary. The latching hooks 30, 31 are preferably designed as snap hooks or may be referred to as such. The latching hooks 30, 31 are resiliently deformable and can be bent outward in the radial direction R away from the axis of symmetry M. The latching hooks 30, 31 are arranged at an offset of 180° to one another in the circumferential direction UR. In particular, the latching hooks 30, 31 are positioned opposite one another.

The base body 28 is hollow. An engaging portion 32 extends through the base body 28 in the direction of the receptacle region 25. The chamfer 25A is arranged between the receptacle region 25 and the engaging portion 25 and connects them to one another. The engaging portion 32 thus transitions into the receptacle region 25 via the chamfer 25A. The engaging portion 32 may also be designed in the form of an internal thread. The engaging portion 32 may, for example, have two to five thread turns. The engaging portion 32 may however also be part of a bayonet closure. In this case, the engaging portion 32 is not an internal thread.

Figure 9:
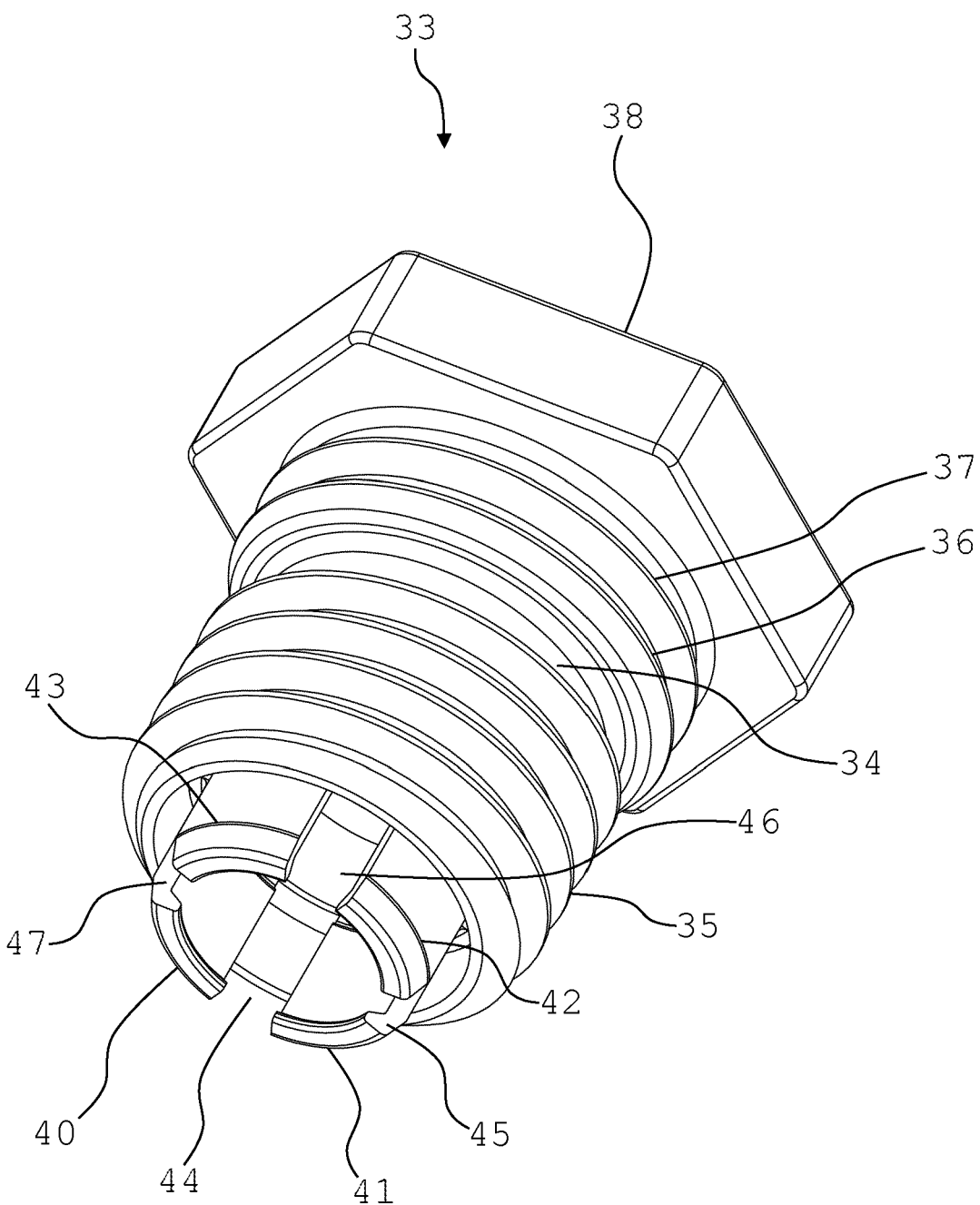
FIG. 9 shows a schematic perspective view of an embodiment of a locking part of a coupling apparatus for the corrugated hose arrangement according to Fig. v 1.
Figure 10:
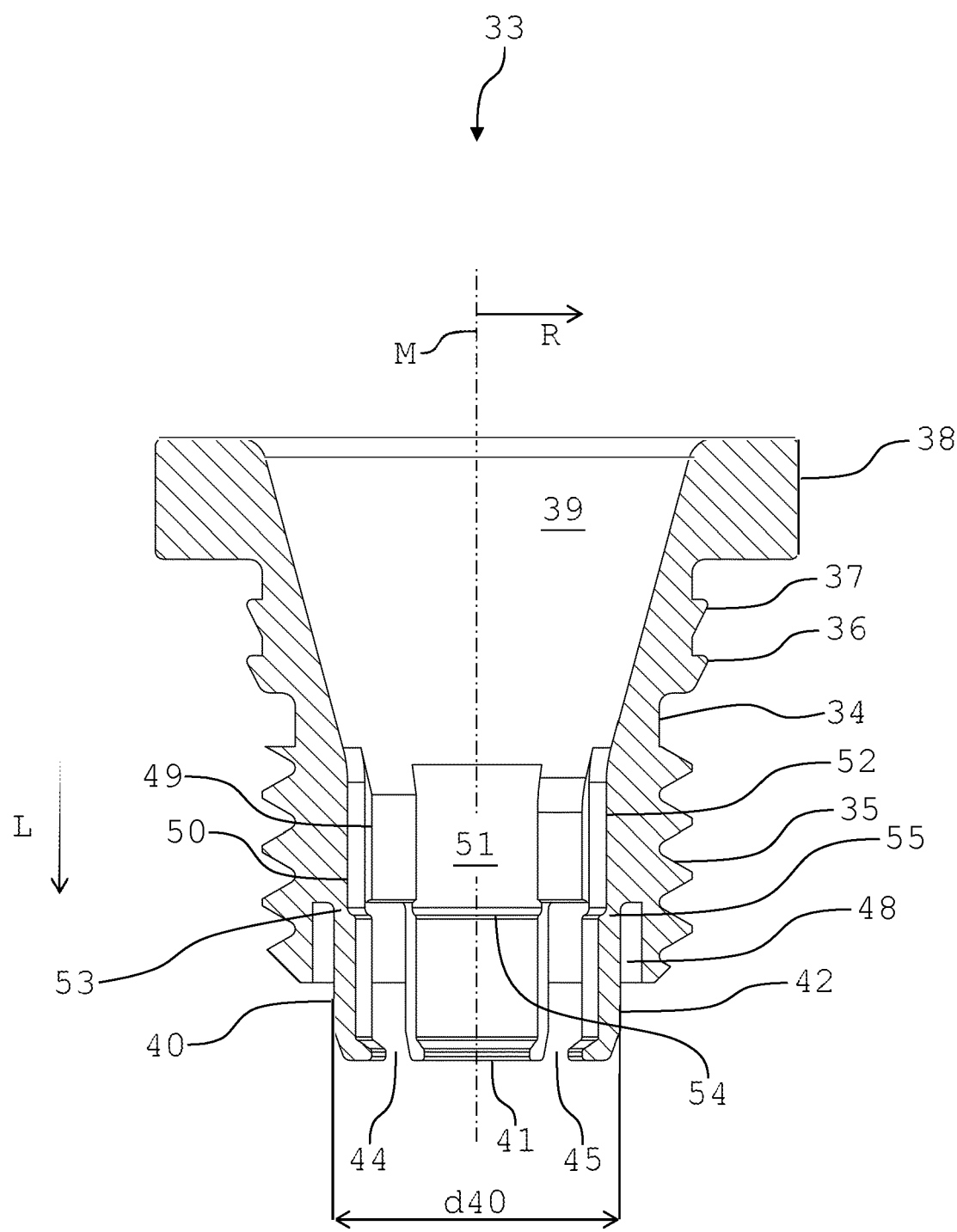
FIG. 10 shows a schematic sectional view of the locking part according to FIG. 9.

Besides the receptacle part 20, the coupling apparatus 3 comprises a locking part 33 shown in FIGS. 9 and 10. The locking part 33 is manufactured from a plastic material. For example, the locking part 33 may be manufactured from POM, PP, or another suitable plastic material. The locking part 33 may also be manufactured from different plastic materials. The locking part 33 is preferably a plastic injection-molded component. The locking part 33 may also be a plastic multi-component injection-molded component. The locking part 33 may however also be manufactured from a metallic material, such as an aluminum alloy or a steel alloy.

The locking part 33 likewise has a rotationally symmetrical structure with respect to the axis of symmetry M. The locking part 33 is hollow and comprises a base body 34, on the outside of which a mating engaging portion 35 in the form of an external thread is provided. The mating engaging portion 35 may also be part of the previously mentioned bayonet closure. In this case, the mating engaging portion 35 is not an external thread.

The mating engaging portion 35 is suitable for interlockingly engaging in the engaging portion 32 of the receptacle part 20. An interlocking connection is established by at least two connection partners, here the engaging portion 32 and the mating engaging portion 35, engaging in or behind one another. This means that the locking part 33 may be screwed into the receptacle part 20. In doing so, the locking part 33 moves along the longitudinal direction L or along the axis of symmetry M into the receptacle part 20. As previously mentioned, the engaging portion 32 and the mating engaging portion 35 may also interact in a different way, e.g., in the form of a bayonet closure.

Two latching lugs or latching ribs 36, 37 extending annularly around the axis of symmetry M are provided on the base body 34. The latching ribs 36, 37 have a wedge-shaped cross-section. The latching ribs 36, 37 are positioned at a distance from one another as viewed in the longitudinal direction L. In particular, a first latching rib 36 and a second latching rib 37 are provided, which are arranged at an axial distance from one another along the longitudinal direction L or along the axis of symmetry M. The latching hooks 30, 31 of the receptacle part 20 are configured to interlockingly engage in or snap into the latching ribs 36, 37. In doing so, the two latching hooks 30, 31 latch either into the first latching rib 36 or into the second latching rib 37.

A grip region 38 is furthermore molded onto the base body 34. The latching ribs 36, 37 are positioned between the mating engaging portion 35 and the grip region 38 as viewed along the longitudinal direction L. The grip region 38 may, for example, be an outer hexagon. Alternatively, the grip region 38 may also be an outer square or the like. The grip region 38 may have the same wrench width as the grip region 29. The grip regions 29, 38 may however also have different wrench widths.

The base body 34 comprises a conical or funnel-shaped insertion opening 39, which has a rotationally symmetrical structure with respect to the axis of symmetry M. The insertion opening 39 extends through the entire base body 34, i.e., through the grip region 38 and the latching ribs 36, 37. The insertion opening 39 is suitable for receiving the corrugated hose 2, in particular one of the end portions 2A, 2B of the corrugated hose 2.

In the orientation of FIGS. 9 and 10, a plurality of engaging elements 40 to 43 extend on the underside out of the base body 34. The number of engaging elements 40 to 43 is arbitrary. For example, four engaging elements 40 to 43 are provided. The engaging elements 40 to 43 are preferably snap hooks, which are configured to interlockingly engage in the wave valleys 7 of the corrugated hose 2. The engaging elements 40 to 43 are resiliently deformable and deformed outward in the radial direction R away from the axis of symmetry M when the corrugated hose 2 is pushed into the locking part 33.

The engaging elements 40 to 43 are arranged regularly or irregularly distributed about the axis of symmetry M and thus form a tubular geometry having an outer diameter or diameter d40. The diameter d40 is smaller than the diameter d25 so that the engaging elements 40 to 43 can be received in the receptacle region 25 of the receptacle part 20. Due to the tubular geometry, the engaging elements 40 to 43 are thus designed as cylinder segments, in particular circular cylinder segments, as viewed along the circumferential direction UR. Between the engaging elements 40 to 43, intermediate spaces 44 to 47 are provided. The engaging elements 40 to 43 and the intermediate spaces 44 to 47 are alternately arranged as viewed along the circumferential direction UR. The intermediate spaces 44 to 47 may be as wide as, wider than, or narrower than the engaging elements 40 to 43 as viewed along the circumferential direction UR.

As FIG. 10 shows, the engaging elements 40 to 43 extend into the mating engaging portion 35 as viewed along the longitudinal direction L. This means that the mating engaging portion 35 extends completely around the engaging elements 40 to 43 as viewed in the radial direction R. Between the mating engaging portion 35 and the engaging elements 40 to 43, an annular gap 48 is provided. The gap 48 extends completely around the axis of symmetry M.

The insertion opening 39 is adjoined by a cylindrical aperture 49, which, like the insertion opening 39, extends through the base body 34. The insertion opening 39 is thus connected to the aperture 49. The corrugated hose 2 can be guided on or in the aperture 49. The aperture 49 is interrupted by a plurality of flat portions 50 to 52 as viewed along the circumferential direction UR. Such a flat portion 50 to 52 is assigned to each engaging element 40 to 43. The flat portions 50 to 52 transition into the engaging elements 40 to 43 at constrictions 53 to 55. The constrictions 53 to 55 serve as bending regions or hinges for the engaging elements 40 to 43. The constrictions 53 to 55 are in particular film hinges.

Figure 11:
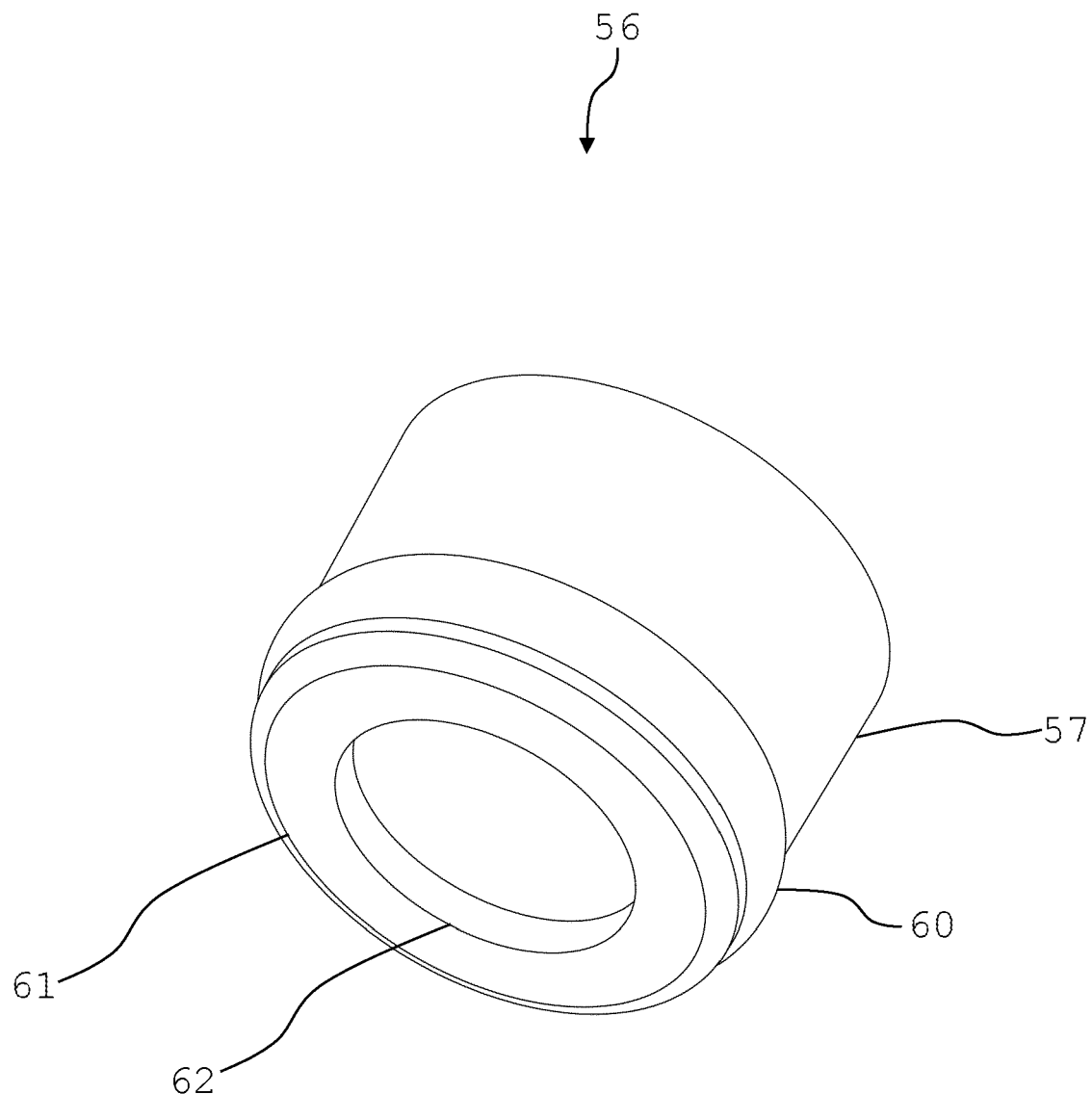
FIG. 11 shows a schematic perspective view of an embodiment of a sealing part of a coupling apparatus for the corrugated hose arrangement according to FIG. 1.
Figure 12:
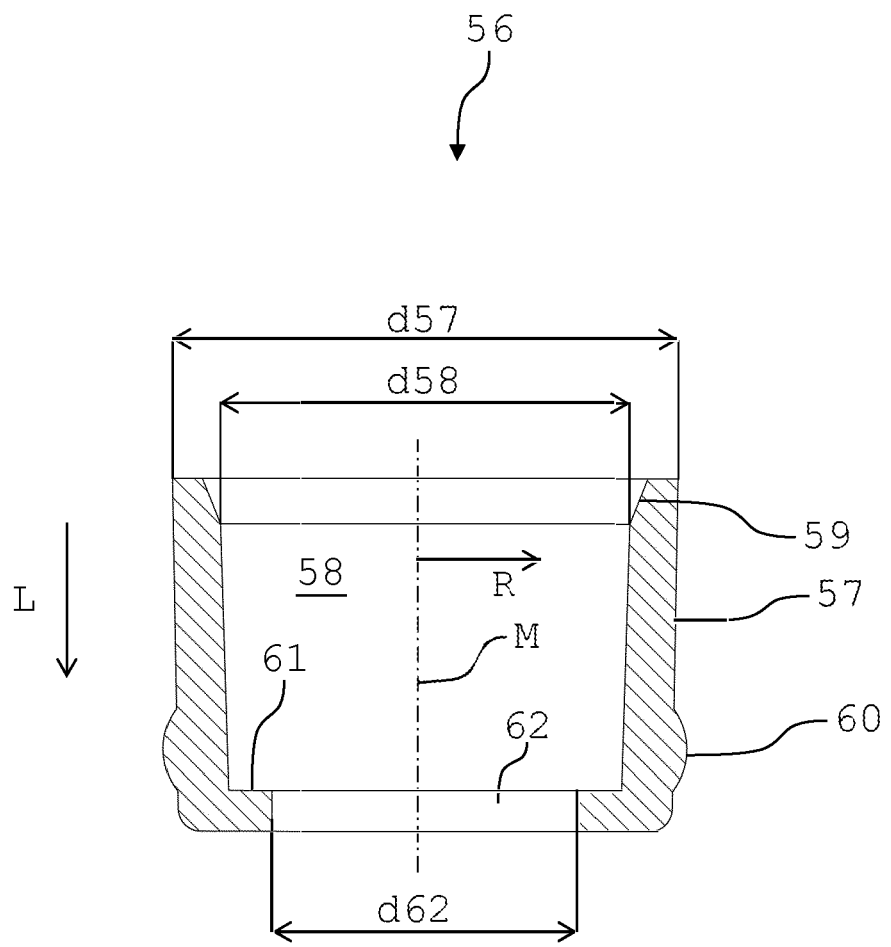
FIG. 12 shows a schematic sectional view of the sealing part according to FIG. 11.
Figure 13:
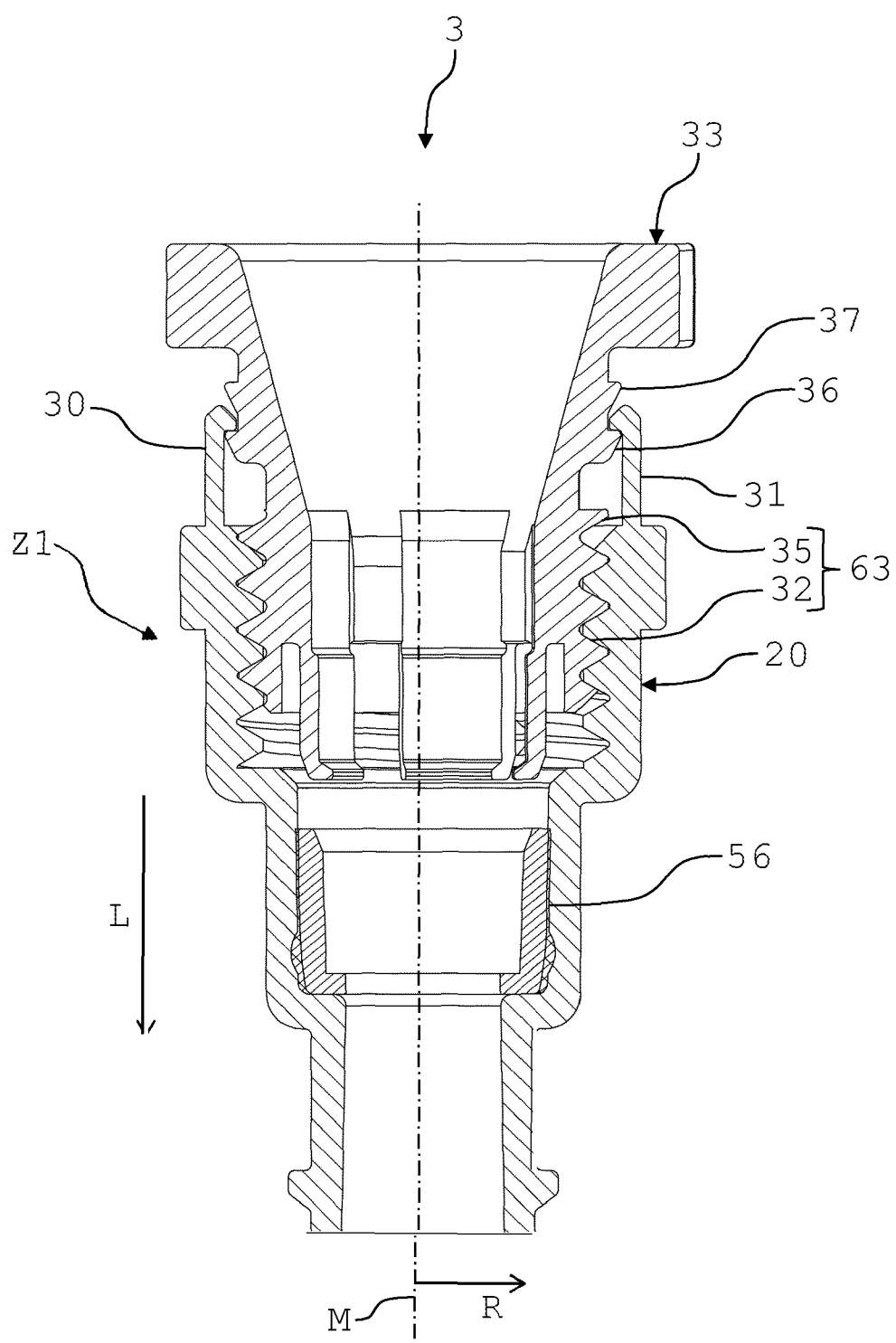
FIG. 13 shows a schematic sectional view of an embodiment of a coupling apparatus for the corrugated hose arrangement according to FIG. 1.

The coupling apparatus 3 moreover comprises a sealing part 56 shown in FIGS. 11 and 12. The sealing part 56 is a plastic or rubber component. For example, the sealing part 56 may be manufactured from a thermoplastic elastomer (TPE), in particular from a thermoplastic polyurethane (TPU), an ethylene-propylene-diene rubber (EPDM), or the like. The sealing part 56 is preferably a plastic injection-molded component. The sealing part 56 has a rotationally symmetrical structure with respect to the axis of symmetry M. The sealing part 56 can be received in the receptacle region 25 of the receptacle part 20. Alternatively, the sealing part 56 may be injection-molded directly onto the receptacle region 25 of the receptacle part 20 in a plastic multi-component injection-molding method.

The sealing part 56 comprises a tubular base body 57. The base body 57 is hollow and comprises a receptacle region 58 for receiving the corrugated hose 2, in particular one of the end portions 2A, 2B of the corrugated hose 2. The receptacle region 58 has a diameter d58 that may be equal to the diameter d6 of the corrugated hose 2. The diameter d58 may however also be slightly greater or slightly smaller than the diameter d6 of the corrugated hose 2. The diameter d58 is particularly preferably slightly smaller than the diameter d6. A circumferential chamfer 59 may be provided on the receptacle region 58. The chamfer 59 facilitates the insertion of the corrugated hose 2 into the sealing part 56.

The base body 57 has an outer diameter or diameter d57. The diameter d57 is slightly greater than the diameter d25 of the receptacle region 25 of the receptacle part 20. A rib 60 extending annularly around the axis of symmetry M is provided on the outside of the base body 57. The rib 60 is curved arcuately, in particular circular-arcuately.

On the face side, the base body 57 is closed at least in sections by means of a cover portion 61. The cover portion 61 comprises an aperture 62 having a diameter d62. The diameter d62 is smaller than the diameter d7 of the corrugated hose 2 so that the corrugated hose 2 cannot be pushed through the aperture 62.

The functionality of the coupling apparatus 3 is explained below with reference to FIGS. 13 to 17. First, the coupling apparatus 3 is assembled. For this purpose, the sealing part 56 is first received in the receptacle part 20. In doing so, the sealing part 56 is pressed into the receptacle region 25 of the receptacle part 20. Both the partially conical profile of the receptacle region 25 and the circumferential rib 60 of the sealing part 56 ensure that the sealing part 56 is pressed into the receptacle region 25 in the radial direction R. As previously mentioned, the sealing part 56 may also be injection-molded directly onto the receptacle part 20 in a multi-component injection-molding method.

Subsequently, the locking part 33 is rotated relative to the receptacle part 20. This rotational movement may but does not have to comprise screwing the locking part 33 into the receptacle part 20. In this case, a screwing movement is realized between the locking part 33 and the receptacle part 20. The locking part 33 is received at least in sections in the receptacle part 20. Instead of a screw connection, another connection, such as a bayonet closure, may however also be provided. The engaging portion 32 of the receptacle part 20 and the mating engaging portion 35 of the locking part 33 interlockingly engage in one another. During the rotational movement of the locking part 33 relative to the receptacle part 20, the engaging portion 32 and the mating engaging portion 35 interact such that the rotational movement is converted into an axial movement of the locking part 33 along the longitudinal direction L or along the axis of symmetry M.

The engaging portion 32 and the mating engaging portion 35 thus form a gear device 63 of the coupling apparatus 3. The gear device 63 may be any type of gears that are suitable to convert the rotational movement of the locking part 33 in relation to the receptacle part 20 into an axial movement or linear movement of the locking part 33 along the longitudinal direction L and relative to the receptacle part 20. It is in particular sufficient if the gear device 63 converts the rotational movement of the locking part 33 in relation to the receptacle part 20 into an axial movement or linear movement of the engaging elements 40 to 43 along the longitudinal direction L or along the axis of symmetry M.

During the rotational movement of the locking part 33 in relation to the receptacle part 20, the locking part 33 is moved along the longitudinal direction L or along the axis of symmetry M in relation to the receptacle part 20 until the latching hooks 30, 31 glide over the first latching rib 36 and latch or snap into it. In doing so, the latching hooks 30, 31 are resiliently deformed outward along the radial direction R away from the axis of symmetry M. The rotational movement of the locking part 33 relative to the receptacle part 20 may comprise screwing the locking part 33 into the receptacle part 20. This is however not necessarily required. Any other connection between the locking part 33 and the receptacle part 20 that moves the receptacle part 20 along the longitudinal direction L or along the axis of symmetry M into the locking part 33 may be used.

The locking part 33 is thus fixed on the receptacle part 20. The receptacle part 20 and the locking part 33 are captively connected to one another. Furthermore, in that the sealing part 56 is pressed into the receptacle part 20, it is also captively connected thereto. The coupling apparatus 3 is now in a preassembled state or unlocked state Z1 shown in FIG. 13. The locking part 33 can be separated from the receptacle part 20 again only if the latching hooks 30, 31 are deformed outward in the radial direction R away from the first latching rib 36 so that they no longer interlockingly engage in or behind the first latching rib 36. At the same time, the locking part 33 is again moved out of the receptacle part 20. This may but does not have to comprise unscrewing the locking part 33 from the receptacle part 20.

Figure 14:
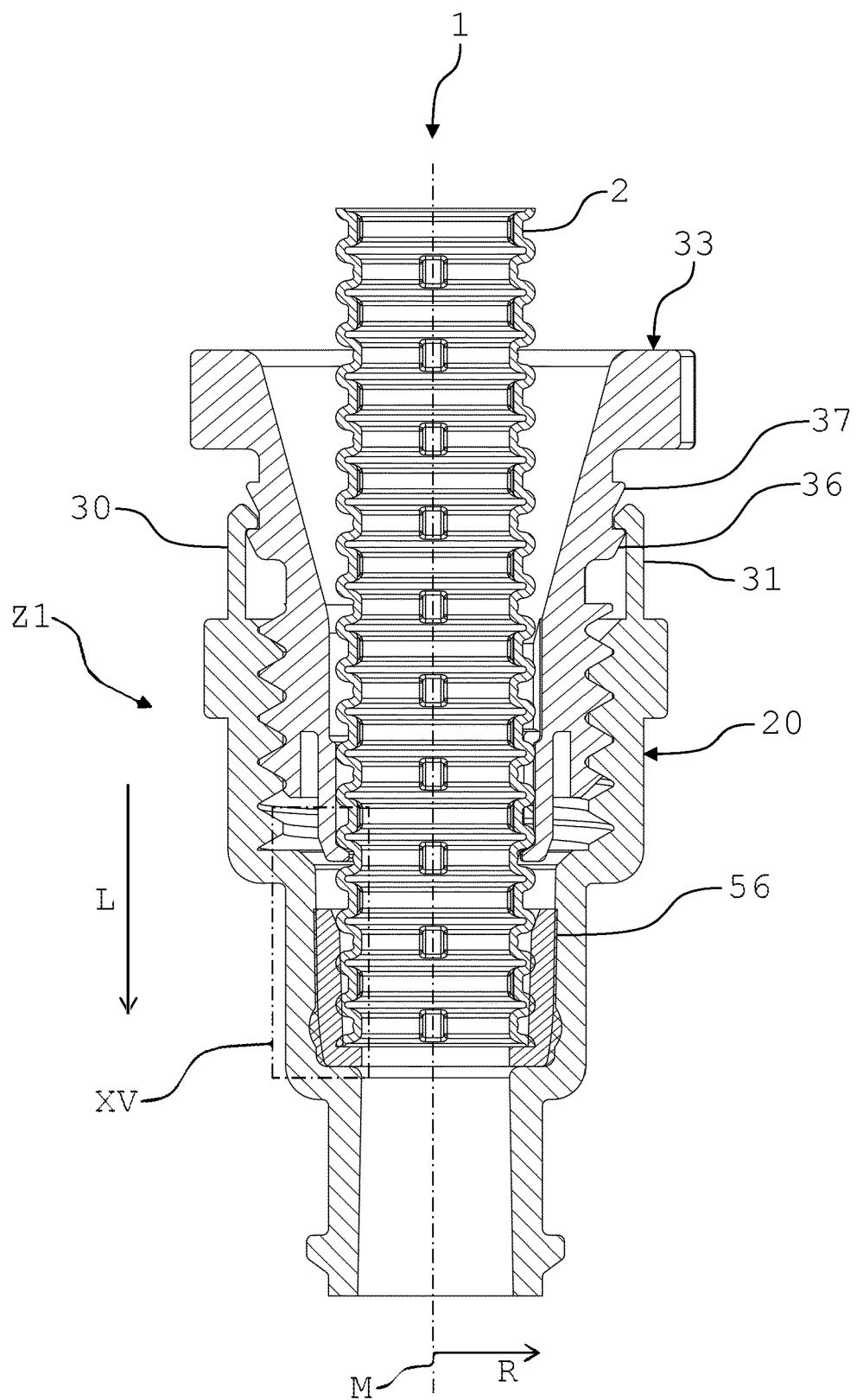
FIG. 14 shows a schematic sectional view of the corrugated hose arrangement according to FIG. 1.
Figure 15:
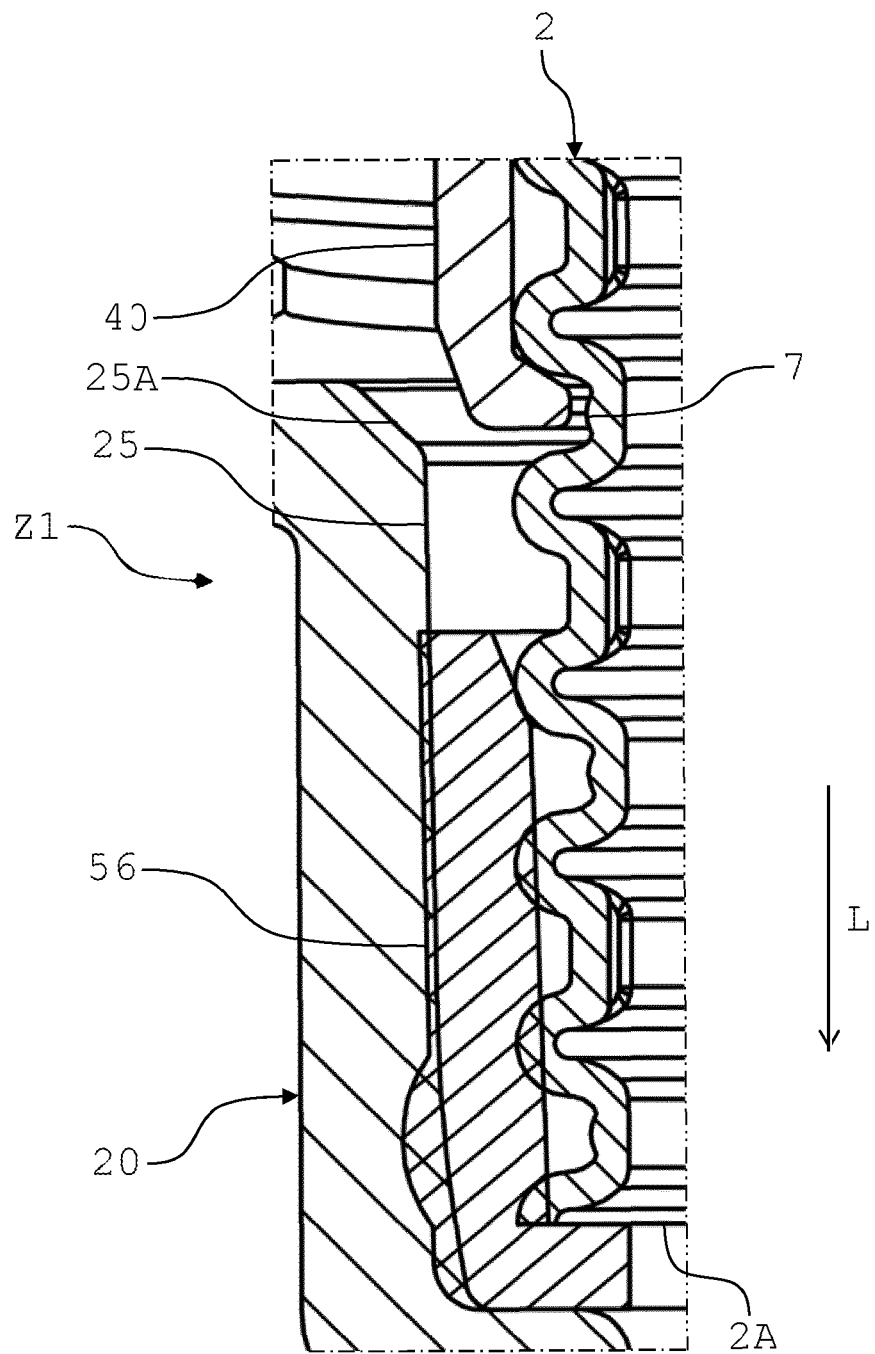
FIG. 15 shows the detailed view XV according to FIG. 14.

Subsequently, as shown in FIGS. 14 and 15, the corrugated hose 2, in particular one of the end portions 2A, 2B of the corrugated hose 2, is inserted into the coupling apparatus 3. In doing so, the conical insertion opening 39 of the locking part 33 serves as guide for the corrugated hose 2. The corrugated hose 2 may be cut both in a wave valley 7 and in a wave crest 6. The respective end portion 2A, 2B is pushed through the engaging elements 40 to 43. In doing so, the engaging elements 40 to 43 are resiliently deformed outward in the radial direction R away from the axis of symmetry M. The engaging elements 40 to 43 glide off on the corrugation 5.

The corrugated hose 2 is pushed into the sealing part 56. The chamfer 59 of the sealing part 56 helps to insert the corrugated hose 2 into the latter. The corrugated hose 2 is pushed into the coupling apparatus 3 until the corrugated hose 2, in particular one of its end portions 2A, 2B, is pushed against the cover portion 61 of the sealing part 56. The corrugated hose 2 is then sealed on the face side in a fluid-tight manner with respect to the sealing part 56. The sealing part 56 can be elastically deformed. The engaging elements 40 to 43 all come to lie together in a common wave valley 7 (FIG. 15) of the corrugated hose 2. The coupling apparatus 3 is still in the unlocked state Z1.

In the unlocked state Z1, the engaging elements 40 to 43 are positioned outside of the receptacle region 25 of the receptacle part 20 as viewed along the longitudinal direction L. The engaging elements 40 to 43 in the unlocked state Z1 may be positioned at least partially within the chamfer 25A. However, the engaging elements 40 to 43 in the unlocked state Z1 may also be positioned completely outside of the chamfer 25A.

Figure 16:
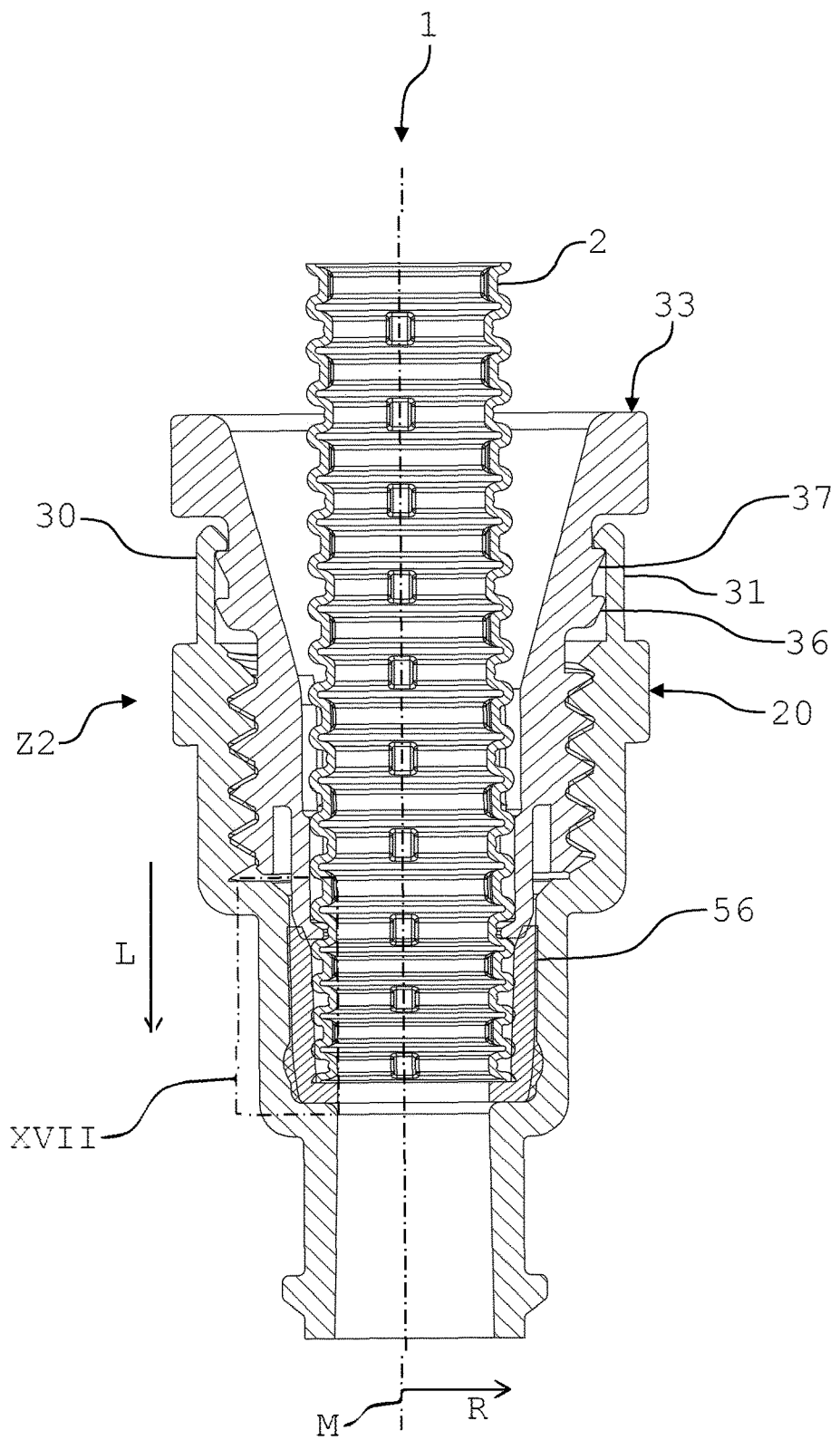
FIG. 16 shows another schematic sectional view of the corrugated hose arrangement according to FIG. 1.
Figure 17:
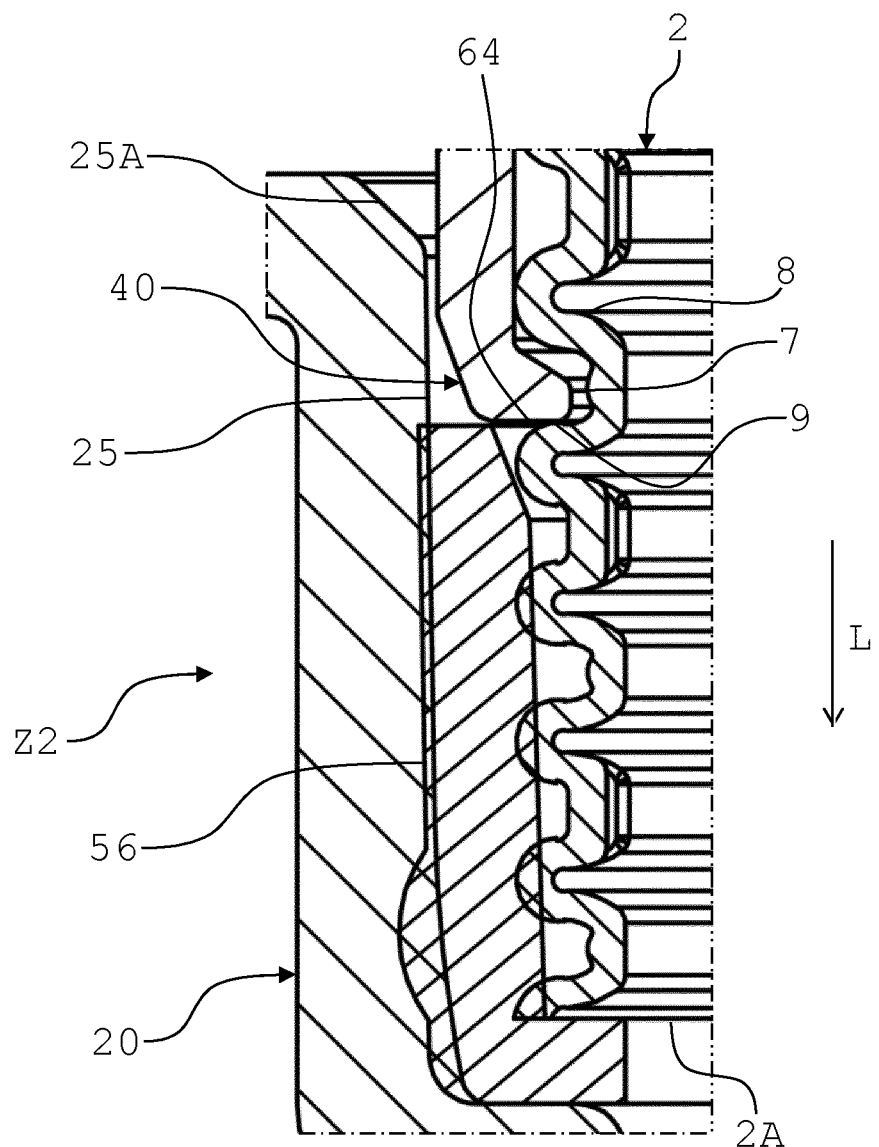
FIG. 17 shows the detailed view XVII according to FIG. 16.

In order to bring the coupling apparatus 3 from the unlocked state Z1 into a final assembled state or locked state Z2 shown in FIGS. 16 and 17, the locking part 33 is moved further into the receptacle part 20 as viewed along the longitudinal direction L. This takes place by means of a rotation of the locking part 33 in relation to the receptacle part 20. For example, the locking part 33 may be screwed into the receptacle part 20 during this rotational movement. In doing so, the latching hooks 30, 31 glide over the second latching rib 37 and snap or latch into it.

At the same time, the engaging elements 40 to 43 are moved into the receptacle region 25 so that a movement of the engaging elements 40 to 43 in the radial direction R away from the corrugated hose 2 is blocked. The corrugated hose 2 can thus no longer be pulled out of the coupling apparatus 3. A respective end face 64 (FIG. 17) of the engaging elements 40 to 43 rests on one of the wave flanks 8, 9 of that wave valley 7 in which the engaging elements 40 to 43 engage, and pushes it along the longitudinal direction L against the cover portion 61 of the sealing part 56, whereby the latter is elastically deformed. This ensures that the corrugated hose 2 is safely pressed into the sealing part 56. The end face 64 is preferably oriented orthogonally to the axis of symmetry M or orthogonally to the longitudinal direction L. The end face 64 may however also be inclined relative to the axis of symmetry M.

The corrugated hose 2 is thus locked in the coupling apparatus 3 on the one hand, and the corrugated hose 2 is pushed into the sealing part 56 on the other hand. This produces a high contact pressure on the sealing part 56, in particular on the cover portion 61 thereof. This ensures fluid-tight sealing of the corrugated hose 2 with respect to the coupling apparatus 3. Against an unintentional release of the locking part 33 from the receptacle part 20, they are locked by means of the latching hooks 30, 31 and the second latching rib 37. Furthermore, by means of the coupling apparatus 3, a reliable fixing of corrugated hoses 2 having a small wave height W is also reliably possible.

The corrugated hose 2 can be separated from the coupling apparatus 3 only if the latching hooks 30, 31 are brought out of engagement with the second latching rib 37 by means of resilient deformation. For this purpose, the latching hooks 30, 31 are bent outward along the radial direction R away from the axis of symmetry M. Subsequently, the locking part 33 is moved out of, in particular unscrewed from, the receptacle part 20 until the latching hooks engage behind the first latching rib 36. The engaging elements 40 to 43 are now arranged outside of the receptacle region 25.

The corrugated hose 2 can now be pulled out of the coupling apparatus 3, wherein the engaging elements 40 to 43 are resiliently deformed and deformed outward along the radial direction R away from the corrugated hose 2. The coupling apparatus 3 can thus again be brought from the locked state Z2 into the unlocked state Z1. For the assembly and disassembly of the corrugated hose arrangement 1, no assembly tools are advantageously required.

Although the present invention was described based on exemplary embodiments, it can be modified in various ways.

LIST OF REFERENCE CHARACTERS

1 Corrugated hose arrangement
2 Corrugated hose
2A End portion
2B End portion
3 Coupling apparatus
4 Wall
5 Corrugation
6 Wave crest
7 Wave valley
8 Wave flank
9 Wave flank
10 Rib
11 Transition region
12 Transition region
13 Connection rib
14 Connection rib
15 Fillet
16 Fillet
17 Outer surface
18 Fillet
19 Fillet
20 Receptacle part
21 Coupling portion
22 Collar
23 Aperture
24 Receptacle portion
25 Receptacle region
25A Chamfer
26 Cavity
27 Cavity
28 Base body
29 Grip region
30 Latching hook
31 Latching hook
32 Engaging portion
33 Locking part
34 Base body
35 Mating engaging portion
36 Latching rib
37 Latching rib
38 Grip region
39 Insertion opening
40 Engaging element
41 Engaging element
42 Engaging element
43 Engaging element
44 Intermediate space
45 Intermediate space
46 Intermediate space
47 Intermediate space
48 Gap
49 Aperture
50 Flat portion
51 Flat portion
52 Flat portion
53 Constriction
54 Constriction
55 Constriction
56 Sealing part
57 Base body
58 Receptacle region
59 Chamfer
60 Rib
61 Cover portion
62 Aperture
63 Gear device
64 End face
d6 Diameter
d7 Diameter
d25 Diameter
d40 Diameter
d57 Diameter
d62 Diameter H Height
I Internal space
L Longitudinal direction
M Axis of symmetry
R Radial direction
U Environment
UR Circumferential direction
W Wave height
Z1 State
Z2 State

The invention claimed is:

1. A coupling apparatus for a corrugated hose, having
a receptacle part for receiving the corrugated hose, and
a locking part, mounted on the receptacle part to be rotatable about an axis of symmetry of the coupling apparatus, for locking the corrugated hose in the coupling apparatus,
wherein the locking part has a resiliently deformable engaging element for interlocking engagement in a corrugation of the corrugated hose,
wherein the receptacle part has a receptacle region for receiving the engaging element,
wherein the coupling apparatus can be brought by means of a rotational movement of the locking part relative to the receptacle part from an unlocked state, in which the engaging element is arranged outside of the receptacle region, into a locked state, in which the engaging element is arranged within the receptacle region such that the receptacle region blocks a movement of the engaging element in a radial direction of the coupling apparatus, and vice versa,
wherein the receptacle part has a latching hook,
wherein the locking part has a first latching rib, in which the latching hook interlockingly engages in the unlocked state, and a second latching rib, in which the latching hook interlockingly engages in the locked state,
wherein the first latching rib and the second latching rib are arranged at a distance from one another along the axis of symmetry of the coupling apparatus, and
wherein the first latching rib and the second latching rib are designed as ribs extending completely around a base body of the locking part.

2. The coupling apparatus according to claim 1, wherein the locking part moves along the axis of symmetry into the receptacle part when the coupling apparatus is brought from the unlocked state into the locked state.

3. The coupling apparatus according to claim 1, wherein the receptacle part has an engaging portion, wherein the locking part has a mating engaging portion, which interlockingly engages in the engaging portion, and wherein the engaging portion and the mating engaging portion interact such that the engaging element moves along the axis of symmetry into the receptacle region during the rotational movement of the locking part relative to the receptacle part.

4. The coupling apparatus according to claim 1, wherein the locking part is mounted on the receptacle part so as to be rotatable about the axis of symmetry.

5. The coupling apparatus according to claim 1, wherein the receptacle region has a conical geometry at least in sections.

6. The coupling apparatus according to claim 1, furthermore comprising a sealing part, received in the receptacle region, for receiving the corrugated hose.

7. The coupling apparatus according to claim 6, wherein the engaging element in the locked state presses the corrugated hose along the axis of symmetry with an end portion of the corrugated hose on the face side against the sealing part.

8. The coupling apparatus according to claim 6, wherein the sealing part has a tubular base body, around which a rib extends on the outside, and a cover portion that has an aperture and closes the base body on the face side.

9. The coupling apparatus according to claim 1,
wherein the engaging element is one of a plurality of engaging elements, and
wherein the locking part has the plurality of engaging elements, which are arranged regularly or irregularly distributed about the axis of symmetry, wherein the engaging elements together form a tubular geometry.

10. The coupling apparatus according to claim 9, wherein intermediate spaces are provided between the engaging elements so that the engaging elements and the intermediate spaces are arranged alternately.

11. The coupling apparatus according to claim 1, the engaging element is connected to the base body of the locking part by means of a constriction functioning as a resiliently deformable hinge.

12. The coupling apparatus according to claim 11, wherein a gap extending annularly around the axis of symmetry is provided between the base body and the engaging element.

13. The coupling apparatus according to claim 1, wherein the locking part has a funnel-shaped insertion opening for inserting the corrugated hose.

14. A corrugated hose arrangement having a coupling apparatus according to claim 1 and the corrugated hose received in the coupling apparatus.

15. The corrugated hose arrangement according to claim 14, wherein the corrugated hose has a corrugation with wave crests and wave valleys arranged alternately along the axis of symmetry, and wherein the corrugation has connection ribs that extend along the axis of symmetry and connect adjacent wave crests to one another.

* * * * *